(12) United States Patent
Yamaga et al.

(10) Patent No.: US 12,406,420 B2
(45) Date of Patent: Sep. 2, 2025

(54) INFORMATION PROCESSING SYSTEM, INFORMATION PROCESSING METHOD, AND COMPUTER PROGRAM

(71) Applicant: GREE, Inc., Tokyo (JP)

(72) Inventors: Keisuke Yamaga, Tokyo (JP); Shinichi Yoshino, Saitama (JP)

(73) Assignee: GREE HOLDINGS, INC., Tokyo (JP)

( * ) Notice: Subject to any disclaimer, the term of this patent is extended or adjusted under 35 U.S.C. 154(b) by 342 days.

(21) Appl. No.: 17/956,822

(22) Filed: Sep. 30, 2022

(65) Prior Publication Data

US 2023/0351658 A1 Nov. 2, 2023

(30) Foreign Application Priority Data

Apr. 27, 2022 (JP) .................................. 2022-073490

(51) Int. Cl.
*G06T 13/40* (2011.01)
*G06F 3/14* (2006.01)
(Continued)

(52) U.S. Cl.
CPC ................ *G06T 13/40* (2013.01); *G06F 3/14* (2013.01); *G06F 3/16* (2013.01); *G06V 40/20* (2022.01)

(58) Field of Classification Search
None
See application file for complete search history.

(56) References Cited

U.S. PATENT DOCUMENTS

| 2020/0077157 A1* | 3/2020 | Kurabuchi | ......... H04N 21/4316 |
| 2021/0076002 A1* | 3/2021 | Peters | ..................... H04N 7/152 |

(Continued)

FOREIGN PATENT DOCUMENTS

| JP | 2015-184689 A | 10/2015 |
| JP | 2020509468 A | 3/2020 |

(Continued)

OTHER PUBLICATIONS

Office Action issued Mar. 3, 2025 in Japanese Patent Application No. 2023-112761.

(Continued)

*Primary Examiner* — James A Thompson
*Assistant Examiner* — Kim Thanh T Tran
(74) *Attorney, Agent, or Firm* — XSENSUS LLP

(57) ABSTRACT

An information processing system includes processing circuitry configured to transmit, to a viewing user terminal, information about a video including a character object of a distributing user to display the video on the viewing user terminal, accept operation information from a distributing user terminal of the distributing user, and perform a display control process, on the video in accordance with the accepted operation information, by applying a predetermined presentation effect to the character object included in the video, or displaying a presentation screen including a predetermined character image related to the character object. The processing circuitry performs the display control process in response to accepting first operation information from the distributing user terminal, and the processing circuitry performs the display control process in response to not accepting second operation information from the distributing user terminal for a predetermined period of time.

17 Claims, 30 Drawing Sheets

(51) Int. Cl.
    *G06F 3/16*         (2006.01)
    *G06V 40/20*     (2022.01)

(56) References Cited

U.S. PATENT DOCUMENTS

| | | | |
|---|---|---|---|
| 2023/0088883 A1* | 3/2023 | Beswick | H04N 21/472 725/38 |
| 2024/0364548 A1* | 10/2024 | Jorasch | H04L 65/1093 |

FOREIGN PATENT DOCUMENTS

| | | |
|---|---|---|
| JP | 2020107264 A | 7/2020 |
| JP | 2021189544 A | 12/2021 |
| JP | 2022063770 A | 4/2022 |
| WO | 2020184021 A1 | 9/2020 |
| WO | 2022079933 A1 | 4/2022 |

OTHER PUBLICATIONS

Office Action issued Jul. 2, 2025 in corresponding Japanese Patent Application No. 2023-112761.

* cited by examiner

FIG. 13

| Type | Number of Likes | Posing |
|---|---|---|
| F | 50,000 OR MORE | Po0060_F001_Pose A |
| | 1,000 TO 49,999 | Po0035_F001_Pose B |
| | 200 TO 999 | Po0049_F001_Pose C |
| | 50 TO 199 | Po0053_F001_Pose D |
| | 0 TO 49 | Po0006_F001_Pose E |
| M | 50,000 OR MORE | Po0050_M001_Pose A |
| | 1,000 TO 49,999 | Po0060_M001_Pose B |
| | 200 TO 999 | Po0054_M001_Pose C |
| | 50 TO 199 | Po0059_M001_Pose D |
| | 0 TO 49 | Po0010_M001_Pose E |

INFORMATION PROCESSING SYSTEM, INFORMATION PROCESSING METHOD, AND COMPUTER PROGRAM

CROSS-REFERENCE TO RELATED APPLICATIONS

The present application claims priority to JP 2022-073490, filed in Japan on Apr. 27, 2022, the content of which are incorporated by reference in its entirety.

BACKGROUND

Conventional information processing systems generate an animation of a character object based on movement of an actor. The conventional information processing systems further distribute a video including the animation of the character object.

SUMMARY

In an exemplary implementation of the present disclosure, an information processing system comprises processing circuitry configured to transmit, to a viewing user terminal, information about a video including a character object of a distributing user to display the video on the viewing user terminal, accept operation information from a distributing user terminal of the distributing user, and perform a display control process, on the video in accordance with the accepted operation information, by applying a predetermined presentation effect to the character object included in the video, or displaying a presentation screen including a predetermined character image related to the character object. The processing circuitry performs the display control process in response to accepting first operation information from the distributing user terminal, and the processing circuitry performs the display control process in response to not accepting second operation information from the distributing user terminal for a predetermined period of time.

BRIEF DESCRIPTION OF THE DRAWINGS

FIG. 13 illustrates another image of a screen displayed on a user terminal;

DETAILED DESCRIPTION OF THE DRAWINGS

Figure 1:
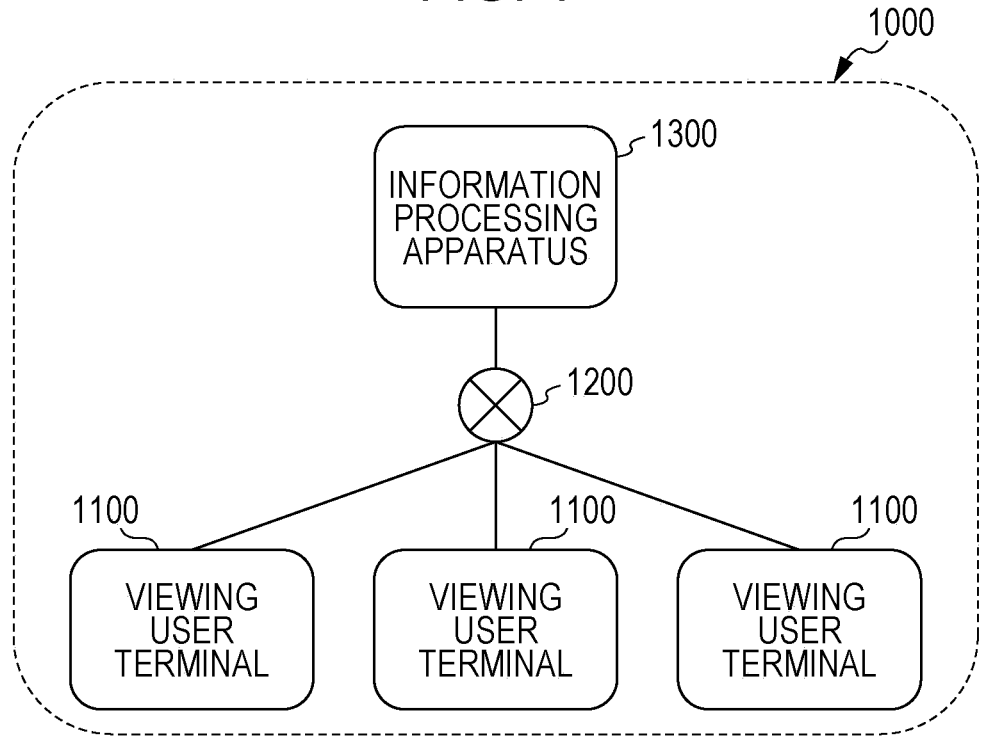
FIG. 1 illustrates a system configuration of an example of an information processing system according to an embodiment of the present disclosure.

The inventors of the present disclosure have realized that an important challenge is to prevent a loss of willingness of the viewing user to engage in viewing. The inventors have developed the technology of the present disclosure to provide a technical improvement that can solve or relieve at least part of the challenge in the related art described above. Specifically, the inventors have developed the technology of the present disclosure present disclosure to provide an information processing system, an information processing method, and a computer program that prevent a loss of willingness of the viewing user to engage in viewing.

An information processing system according to an aspect of the present disclosure includes one or more computer processors. The one or more computer processors include a distributing unit configured to transmit, to a viewing user terminal, information about a video including a character object of a distributing user to display the video on the viewing user terminal; an accepting unit configured to accept operation information from a distributing user terminal of the distributing user; and a first display control unit configured to perform display control on the video in accordance with the operation information accepted by the accepting unit. As the display control, the first display control unit applies a predetermined presentation effect to the character object included in the video, or displays a presentation screen including a predetermined character image related to the character object. The first display control unit performs the display control in response to accepting first operation information from the distributing user terminal, or in response to not accepting, by the accepting unit, second operation information from the distributing user terminal for a predetermined period of time.

The predetermined presentation effect may be to display, in association with the character object in a motionless state, an object for showing a viewing user that the character object is not behaving on the basis of movement of the distributing user.

The character image included in the presentation screen may be a two-dimensional version of the character object or a smaller-sized version of the character object. The character image may not behave on the basis of movement of the distributing user.

The one or more computer processors may further include a counting unit configured to count actions of the viewing user terminal on the video, and a determining unit configured to determine posing data or motion data to be applied to the character object having the predetermined presentation effect applied thereto, or to the character image, on the basis of a result of counting performed by the counting unit. A behavior based on the posing data or the motion data determined by the determining unit may be applied to the character object having the predetermined presentation effect applied thereto, or to the character image.

The one or more computer processors may further include a setting accepting unit configured to accept a setting made by the distributing user for the display control. The setting accepting unit may accept at least one of a setting for a background of the presentation screen, a setting for the predetermined period of time, a setting for text to be displayed on the presentation screen, a setting for audio input during the display control, and a setting for the character object having the predetermined presentation effect applied thereto, or for the character image.

The setting accepting unit can accept the setting during distribution of the video. The setting accepting unit can set a still image of the character object as the character image to be displayed on the presentation screen. The still image is shot by a distributing user's operation during distribution of the video.

The first operation information may be transmitted from the distributing user terminal in response to a distributing user's operation on a first operation object displayed on a screen of the distributing user terminal.

The second operation information may be audio information and/or motion information from the distributing user terminal. The motion information is for moving the character object.

The first display control unit may terminate the display control in response to accepting third operation information from the distributing user terminal, or in response to accepting, by the accepting unit, the second operation information from the distributing user terminal.

The third operation information may be transmitted from the distributing user terminal in response to a distributing user's operation on a second operation object displayed on a screen of the distributing user terminal.

The accepting unit may further accept a display request to display gifts from the viewing user terminal. The one or more computer processors may further include a second display control unit configured to control display of gift objects corresponding to the gifts in the video. For a display request accepted by the accepting unit during display control by the first display control unit, the second display control unit may not display the gift objects during the display control by the first display control unit, and may display the gift objects corresponding to the display request in a predetermined order after termination of the display control by the first display control unit.

The accepting unit may further accept a display request to display comments from the viewing user terminal. The one or more computer processors may further include a third display control unit configured to control display of the comments in the video. For a display request accepted by the accepting unit during display control by the first display control unit, the third display control unit may perform display during the display control by the first display control unit. The third display control unit may display comments on a screen of at least the distributing user terminal in such a way that the comments can be identified as corresponding to the display request accepted during the display control by the first display control unit.

The one or more computer processors may further include a measuring unit configured to measure an elapsed time from when the first display control unit started the display control. The first display control unit may display the elapsed time in the video subjected to the display control.

If the video includes a character object of a second user, the first display control unit may perform the display control in response to accepting the first operation information from the distributing user terminal or a user terminal of the second user, or in response to not accepting, by the accepting unit, the second operation information from the distributing user terminal and the user terminal of the second user for a predetermined period of time.

An information processing method according to another aspect of the present disclosure causes one or more computer processors to execute a distributing step of transmitting, to a viewing user terminal, information about a video including a character object of a distributing user to display the video on the viewing user terminal; an accepting step of accepting operation information from a distributing user terminal of the distributing user; and a first display control step of performing display control on the video in accordance with the operation information accepted in the accepting step. As the display control, the first display control step applies a predetermined presentation effect to the character object included in the video, or displays a presentation screen including a predetermined character image related to the character object. The first display control step performs the display control in response to accepting first operation information from the distributing user terminal, or in response to not accepting, in the accepting step, second operation information from the distributing user terminal for a predetermined period of time.

An information processing method according to another aspect of the present disclosure causes one or more computer processors to execute a transmitting step of transmitting, to a server apparatus, information about a video including a character object that behaves on the basis of movement of a distributing user and information about a distributing user's operation; and a first display control step of performing display control on the video in accordance with the distributing user's operation. As the display control, the first display control step applies a predetermined presentation effect to the character object included in the video, or displays a presentation screen including a predetermined character image related to the character object. The first display control step performs the display control in response to a first operation by the distributing user, or in response to not accepting a second operation by the distributing user for a predetermined period of time.

A computer program according to another aspect of the present disclosure causes one or more computer processors to implement a transmitting function of transmitting, to a server apparatus, information about a video including a character object that behaves on the basis of movement of a distributing user and information about a distributing user's operation; and a first display control function of performing display control on the video in accordance with the distributing user's operation. As the display control, the first display control function applies a predetermined presentation effect to the character object included in the video, or displays a presentation screen including a predetermined character image related to the character object. The first display control function performs the display control in response to a first operation by the distributing user, or in response to not accepting a second operation by the distributing user for a predetermined period of time.

An information processing method according to another aspect of the present disclosure causes one or more computer processors to execute a receiving step of receiving, from a server apparatus, information about a video including a character object that behaves on the basis of movement of a distributing user; a display step of displaying the video on the basis of the information received in the receiving step; and a transmitting step of transmitting a gift and/or comment display request to the server apparatus in response to a viewing user's operation. The display step displays the video which is subjected to display control in accordance with operation information from a distributing user terminal. The display control involves applying a predetermined presentation effect to a character object included in the video, or displaying a presentation screen including a predetermined character image related to the character object.

A computer program according to another aspect of the present disclosure causes one or more computer processors to implement a receiving function of receiving, from a server apparatus, information about a video including a character object that behaves on the basis of movement of a distributing user; a display function of displaying the video on the basis of the information received by the receiving function; and a transmitting function of transmitting a gift and/or comment display request to the server apparatus in response to a viewing user's operation. The display function displays the video which is subjected to display control in accordance with operation information from a distributing user terminal. The display control involves applying a predetermined presentation effect to a character object included in the video, or displaying a presentation screen including a predetermined character image related to the character object.

The present disclosure may provide a technical improvement that solves or relieves at least part of the challenge in the related art described above. Specifically, the present disclosure may provide a technique that prevents a loss of willingness of the viewing user to engage in viewing.

First, an overview of an information processing system according to an embodiment of the present disclosure will be described with reference to the drawings.

The information processing system according to the embodiment of the present disclosure is an information processing system that includes at least one information processing apparatus and server apparatus and includes one or more computer processors.

A video displayed on each apparatus will be described as one that includes a three-dimensional (3D) or two-dimensional (2D) animation of a character object generated on the basis of movement of a distributing user. However, the video is not limited to this. The video may be one that includes an animation of a character object generated in accordance with a distributing user's operation, or may be one that includes an actual image of the distributing user. Instead of displaying the character object or the distributing user, the video may provide only the voice of the distributing user.

The distributing user refers to a user who transmits picture- and/or audio-related information. For example, the distributing user may simply be a main user who hosts or organizes individual video distribution, collaboration distribution which allows participation by multiple people, video chats or voice chats which allow participation or viewing by multiple people, or events (e.g., parties) in virtual space which allow participation or viewing by multiple people. Therefore, the distributing user according to the embodiment of the present disclosure may also be referred to as a host user or an organizer user.

On the other hand, the viewing user refers to a user who receives picture- and/or audio-related information. The viewing user may be a user who can not only receive the information described above, but can also respond to the information described above. For example, the viewing user may simply be a user who views video distribution or collaboration distribution, or participates in or views video chats, voice chats, or events. Therefore, the viewing user according to the embodiment of the present disclosure may also be referred to as a guest user, a participating user, a listener, an audience user, or a cheering user.

The information processing system according to the embodiment of the present disclosure is a digital world which allows many people to participate at the same time, freely interact with each other, and work and play together through character objects (avatars) at close to a real-world level. The information processing system according to the embodiment of the present disclosure can thus be used to provide the next Internet space (metaverse) which allows social activities across the boundary between reality and virtual reality.

In this space, the users' avatars can freely walk around in the world and communicate with each other.

Of a plurality of avatars in the virtual space, one avatar (character object) may be configured to be capable of distributing a video, as a character object of the distributing user. That is, the information processing system may be configured to allow one-to-many video distribution in the many-to-many metaverse virtual space.

In this space, there is no particular distinction between the distributing user and the viewing user.

The space displayed in the video may be a virtual space, a real space, or an augmented reality space which combines virtual and real spaces. The video may be one that plays at least a predetermined picture and voice of the distributing user, such as a karaoke video or a live game commentary. The character object or the actual image of the distributing user may be superimposed on the video.

When the real space includes the distributing user, a character object generated on the basis of movement of the distributing user may be superimposed on the actual image of the distributing user. An animation of gift objects may be superimposed on a shot image of the real space.

<System Configuration>

As illustrated as an example in FIG. 1, an information processing system 1000 according to an embodiment of the present disclosure can include one or more viewing user terminals 1100 and an information processing apparatus (support computer) 1300 connected to the viewing user terminals 1100 through a network 1200. The information processing apparatus 1300 is installed, for example, in a video distribution studio.

The information processing apparatus 1300 may be connected to a predetermined server apparatus through the Internet, so that the server apparatus performs part of or the entire processing to be performed by the information processing apparatus 1300. The server apparatus may be an information processing apparatus 2400 illustrated in FIG. 2.

In the present specification, distribution carried out by the information processing system 1000 is referred to as studio distribution.

In the studio distribution, the movement of the entire body of the distributing user (actor) is reflected in real time in a character using a known motion capture technology, in which markers attached to the body of the distributing user are shot with a camera installed in the studio.

Figure 2:
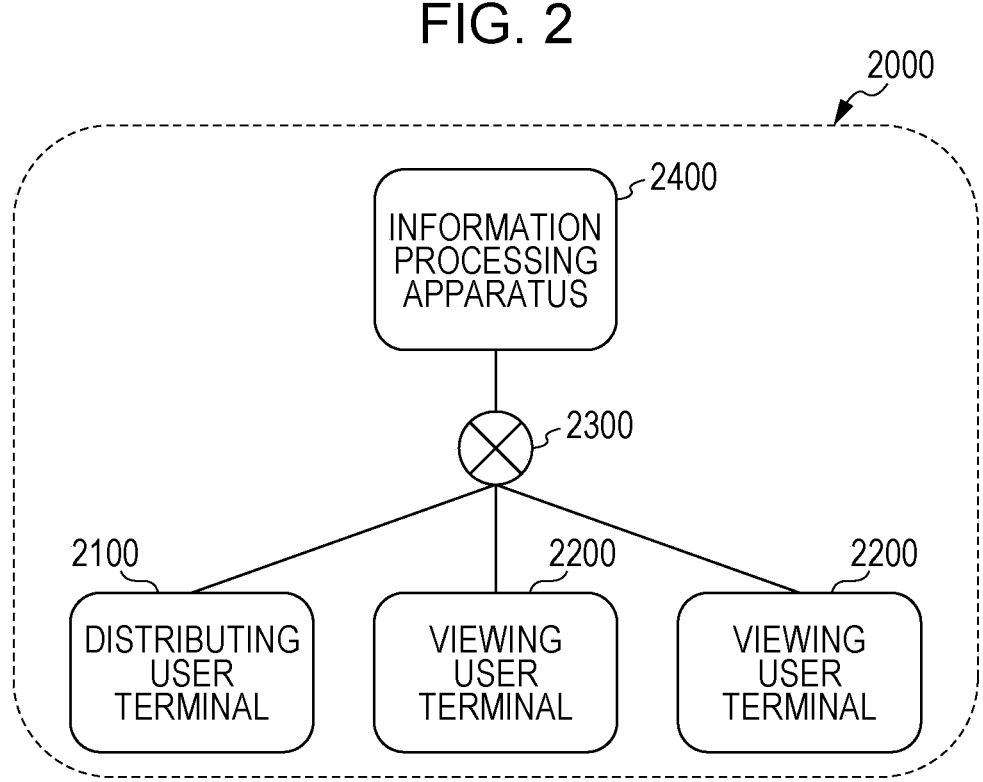
FIG. 2 illustrates another system configuration of an example of an information processing system according to an embodiment of the present disclosure.

The information processing system 1000 according to the embodiment of the present disclosure can operate in coordination with another information processing system 2000 illustrated as an example in FIG. 2. The information processing system 2000 illustrated in FIG. 2 can include a distributing user terminal 2100, one or more viewing user terminals 2200, and the information processing apparatus (server apparatus) 2400 connected to the distributing user terminal 2100 and the viewing user terminals 2200 through a network 2300.

In the example described above, the distributing user terminal 2100 may be an information processing terminal, such as a smartphone. In the present specification, distribution carried out by the information processing system 2000 is referred to as mobile distribution.

In the mobile distribution, the facial movement of the distributing user is reflected in real time in a character's face using a known face tracking technology, in which the face of the distributing user is shot with a camera on the distributing user terminal 2100.

In the mobile distribution, there is no particular distinction between the distributing user and the viewing user. The viewing user can perform mobile distribution at any time, and the distributing user can become a viewing user when viewing a video of another distributing user.

A video generated by the information processing system 1000 and the information processing system 2000 can be distributed, for example, from one video distribution platform to viewing users.

In any distribution, a process of generating an animation by reflecting motions in the character and a process of displaying gifts (described below) may be shared by the distributing user terminal, the viewing user terminal, the information processing apparatus, and other apparatuses.

That is, the term "distribution" here refers to transmitting information that allows a video to be viewed on the viewing user terminals. Video rendering may be performed by the information processing apparatuses 1300 and 2400, or may be performed by the distributing user terminal 2100 and the viewing user terminals 1100 and 2200.

Specifically, face motion data and audio data of the distributing user are transmitted from the distributing user terminal or the information processing apparatus to the terminal or apparatus that generates (or renders) an animation of the character object. Body motions may be transmitted in addition to face motions.

In the embodiment of the present disclosure, a process of generating an animation will be described as being performed by each of the distributing user terminal and the viewing user terminal, but the configuration is not limited to this.

Figure 3:
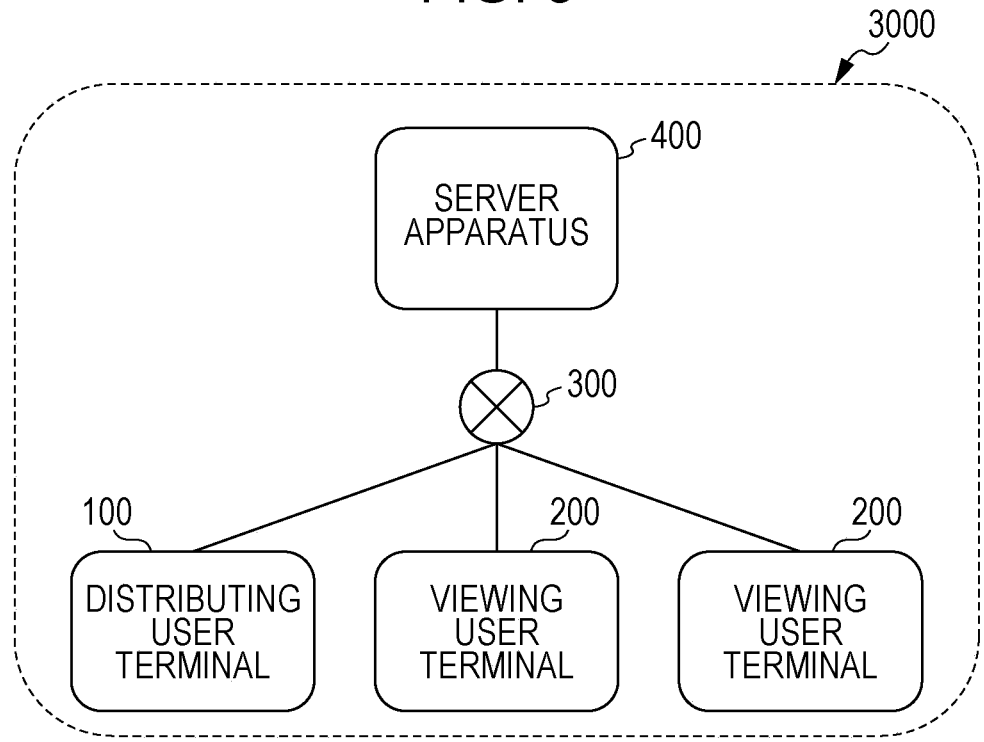
FIG. 3 illustrates another system configuration of an example of an information processing system according to an embodiment of the present disclosure.

The information processing system according to the embodiment of the present disclosure is applicable to both of the examples illustrated in FIG. 1 and FIG. 2. Accordingly, as illustrated in FIG. 3, an information processing system 3000 according to the embodiment of the present disclosure will be described as including a distributing user terminal 100, viewing user terminals 200, and a server apparatus 400 that can connect to the distributing user terminal 100 and the viewing user terminals 200 through a network 300.

The distributing user terminal 100 functions at least as the information processing apparatus 1300 or the distributing user terminal 2100 described above, the viewing user terminal 200 functions at least as the viewing user terminals 1100 and 2200 described above, and the server apparatus 400 functions at least as the predetermined server apparatus or the information processing apparatus 2400 described above.

In the embodiment of the present disclosure, the distributing user terminal 100 and the viewing user terminal 200 may be smartphones (multifunctional phone terminals), tablet terminals, personal computers, console game machines, wearable computers such as head-mounted displays (HMDs) or eyeglass-type wearable terminals (e.g., augmented reality (AR) glasses), or other information processing apparatuses capable of playing videos. The terminals described above may be stand-alone devices capable of independently operating, or may be connected to a plurality of other devices to be able to transmit and receive various types of data to and from each other.

<Hardware Configuration>

A hardware configuration of the distributing user terminal 100 will now be described with reference to FIG. 4. The distributing user terminal 100 includes a processor 101, a memory 102, a storage 103, an input-output interface (input-output I/F) 104, and a communication interface (communication I/F) 105, which are connected to each other through a bus B.

The distributing user terminal 100 can implement the functions and methods described in the present embodiment through cooperation of the processor 101, the memory 102, the storage 103, the input-output I/F 104, and the communication I/F 105.

The processor 101 executes the functions and/or methods implemented by code or commands included in a program stored in the storage 103. The processor 101 may include, for example, a central processing unit (CPU), a microprocessing unit (MPU), a graphics processing unit (GPU), a microprocessor, a processor core, a multiprocessor, an application-specific integrated circuit (ASIC), and a field-programmable gate array (FPGA). A logic circuit (hardware) or a dedicated communication circuit formed on an integrated circuit (IC) chip or a large-scale integration (LSI) may implement each of processing steps disclosed in each embodiment. The circuits described above may be implemented by one or more integrated circuits, and a plurality of processing steps described in each embodiment may be implemented by one integrated circuit. The LSI may be referred to as a very large-scale integration (VLSI), a super LSI, or an ultra LSI, depending on the degree of integration. Additionally, the processor 101 may also be encompassed by or is a component of control circuitry and/or processing circuitry. The functionality of the elements disclosed herein may be implemented using circuitry or processing circuitry which includes general purpose processors, special purpose processors, integrated circuits, ASICs, conventional circuitry and/or combinations thereof which are configured or programmed to perform the disclosed functionality. Processors are considered processing circuitry or circuitry as they include transistors and other circuitry therein.

The memory 102 temporarily stores a program loaded from the storage 103 and provides the processor 101 with a work area. The memory 102 also temporarily stores various types of data generated while the processor 101 is executing the program. The memory 102 includes, for example, a random-access memory (RAM) and a read-only memory (ROM).

The storage 103 stores programs. The storage 103 includes, for example, a hard disk drive (HDD), a solid-state drive (SSD), and a flash memory.

The communication I/F 105 is implemented as hardware such as a network adapter, communication software, or a combination of both, and is configured to allow transmission and reception of various types of data through the network 300. The communication may be executed either wirelessly or through wired connections. Any communication protocol may be used here, as long as it allows execution of mutual communication. The communication I/F 105 communicates with other information processing apparatuses through the network 300. The communication I/F 105 transmits various types of data to the other information processing apparatuses in accordance with instructions from the processor 101. Also, the communication I/F 105 receives various types of data transmitted from the other information processing apparatuses and transfers them to the processor 101.

The input-output I/F 104 includes an input device used to input various operations to the distributing user terminal 100, and an output device configured to output a result of processing performed by the distributing user terminal 100. The input device and the output device in the input-output OF 104 may form an integral unit or may be implemented as separate units.

The input device is implemented by any one of, or a combination of, all types of devices that can accept an input from the user and transfer information about the input to the processor 101. The input device includes, for example, a touch panel, a touch display, hardware keys on a keyboard, a pointing device such as a mouse, a camera (input of operations via images), and a microphone (input of operations by voice).

The input device can include a sensor unit. The sensor unit is constituted by one or more sensors configured to detect face motions that reflect changes in user's facial expression, and body motions that reflect changes in the position of the user's body relative to the sensor unit. The face motions include eye blinks and opening and closing of the mouth. A known sensor unit may be used here. Examples of the sensor unit include a time-of-flight (ToF) sensor that measures and detects the time it takes for light emitted toward the user to reflect off, for example, the user's face and return (time of flight), a camera for shooting the user's face, and an image processor that performs image processing on the data captured by the camera. The sensor unit may include an RGB camera that captures visible light and a near-infrared camera that captures near-infrared light. As the RGB camera and the near-infrared camera, for example, a True Depth camera on the "iPhone X (registered trademark)", a "LIDAR" sensor on the "iPad Pro (registered trademark)", and other ToF sensors mounted on smartphones can be used. Specifically, a dot projector for the camera projects several tens of thousands of dots of invisible light, for example, onto the user's face. Accurate facial data is thus captured by detecting the reflected light from the dot pattern, analyzing the detected light to generate a facial depth map, and capturing an infrared image of the face. A computing processor of the sensor unit generates various types of information on the basis of the depth map and the infrared image, and compares the information to registered reference data to calculate the depth at each point of the face (i.e., the distance between each point and the near-infrared camera) and positional displacement outside the depth points.

The sensor unit may have the function of tracking the hands (hand tracking function), as well as the function of tracking the user's face. The sensor unit may include other sensors, such as an acceleration sensor and a gyroscope sensor, as well as those described above. The sensor unit may have the function of recognizing objects in real space where the user is present, on the basis of the result of detection made by the ToF sensor or other known sensors, and mapping the recognized objects on a spatial map (space mapping function). Hereinafter, data representing the detected face motions and data representing the detected body motions will be simply referred to as "tracking data" when such data is described without a particular distinction. The image processor of the sensor unit may be included in a control unit that can be included in the information processing system according to the embodiment of the present disclosure.

Any operation unit suitable for the type of the user terminal may be used as the input device. Examples of the operation unit include a touch panel integrated with a display device, operation buttons on the housing of the user terminal, a keyboard, a mouse, and a controller operable by the user's hand. The controller may include various known sensors, such as an acceleration sensor and an inertial measuring sensor (or inertial measurement unit (IMU)), such as a gyroscope. Another example of the operation unit may be a tracking device that identifies the user's hand movement, eye movement, head movement, and eye direction. With this configuration, it is possible, for example, to determine the user's instruction on the basis of the user's hand movement, start or end the distribution of a video, and execute various operations, such as evaluation of messages and videos and making a request to display a predetermined object (e.g., gift, described below). The operation unit is optional when the sensor unit also has an input interface function, such as a hand tracking function.

The output device outputs a result of processing performed by the processor 101. The output device includes, for example, a touch panel and a speaker.

Figure 4:
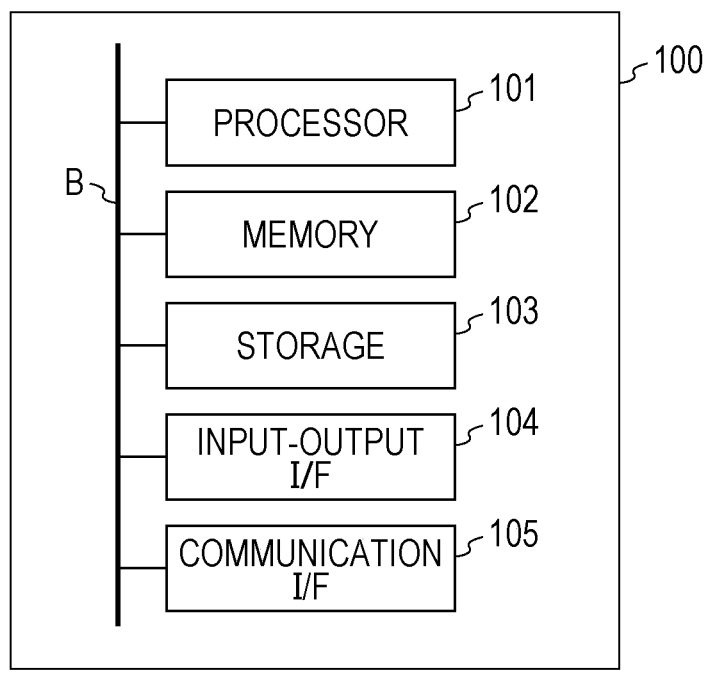
FIG. 4 illustrates a hardware configuration of a server apparatus, a distributing user terminal, and a viewing user terminal according to an embodiment of the present disclosure.

Unless otherwise specified, the viewing user terminal 200 and the server apparatus 400 according to the embodiment of the present disclosure have the same hardware configuration as that illustrated in FIG. 4.

Next, with reference to the drawings, a description will be given of a transition of displayed screens, as well as various functions that can be executed on a user terminal where an application program implemented by the information processing system according to the embodiment of the present disclosure is running.

Figure 5:
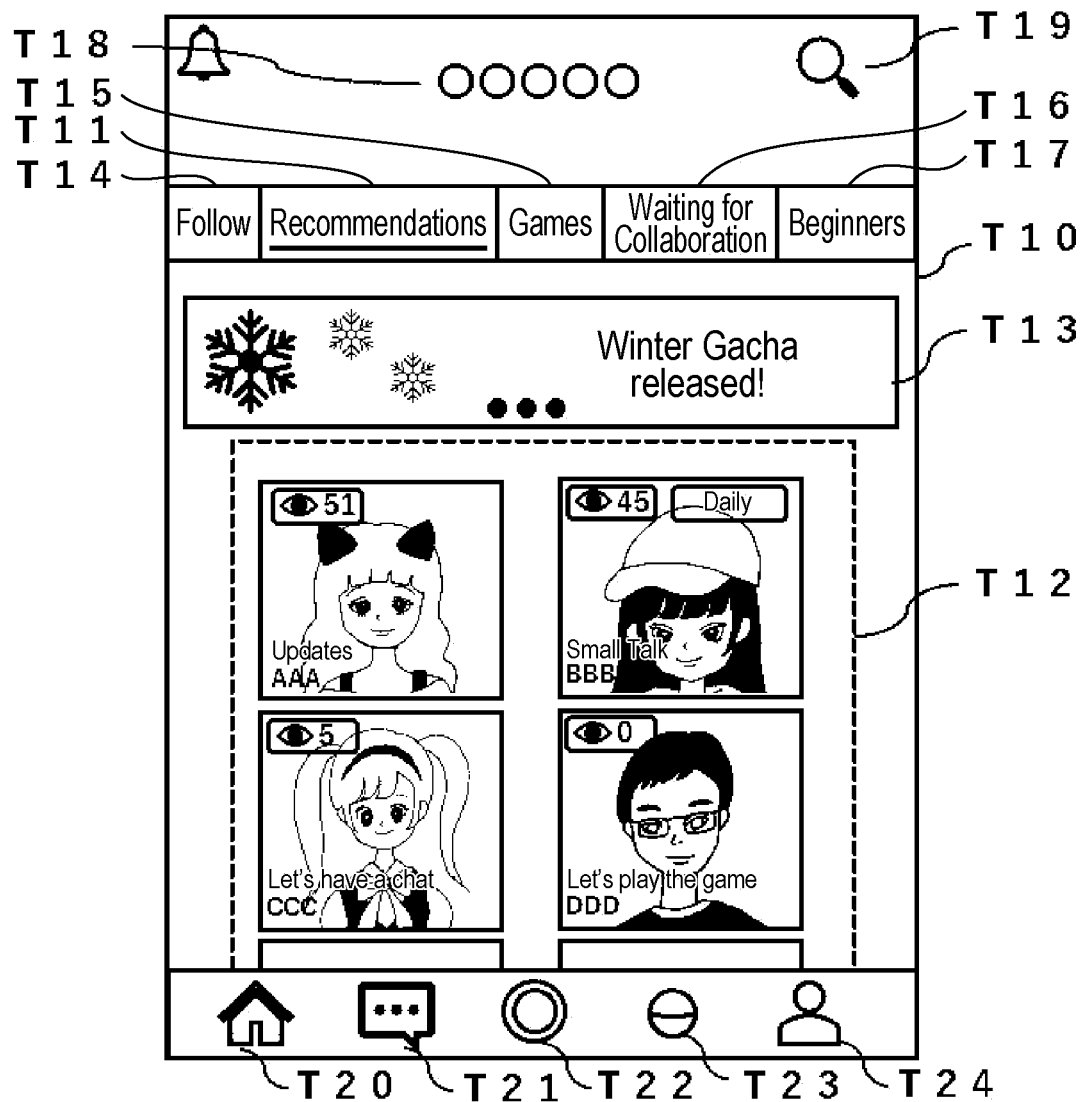
FIG. 5 illustrates an image of a screen displayed on a user terminal.

FIG. 5 illustrates a top screen T10 displayed on the user terminal when a video distributing and viewing application program is started. Note that the type of operation, viewing or distributing, performed on the user terminal by the user has yet to be specified at this point.

As illustrated in FIG. 5, by selecting a distribution channel (referred to, for example, as a distribution frame, distribution program, or distribution video) from thumbnail images of one or more recommended distribution channels T12 displayed as a list under a Recommendations tab T11 on the top screen T10, the user can view a video played on the selected distribution channel.

Alternatively, by accessing a permanent link to a specific distribution channel, the user can view a video played on the specific distribution channel. The user can obtain such a permanent link from a notice sent by the distributing user (who the user follows), or from a shared notice sent by other users.

Accordingly, a user who views a video is a viewing user, and a terminal used to view the video is the viewing user terminal 200.

As illustrated in FIG. 5, the top screen T10 may present a notice display field T13 for displaying notices of campaigns and events. A notice displayed in the notice display field T13 can be switched to another by a sliding action.

The top screen T10 presents a Follow tab T14, a Game tab T15 for displaying game categories, a Waiting for Collaboration tab T16 for displaying a list of distribution channels waiting for collaboration, and a Beginner tab T17 for displaying distribution channels for beginners. Selecting one of the tabs (switching the tab from one to another) enables transition from the top screen T10 to another screen.

A service name T18 and a search button T19 in the upper section of the top screen T10 may remain displayed on a new screen that appears after transition.

Similarly, a home button T20, a message button T21, a distribution preparation button T22, a gacha button T23, and a profile button T24 in the bottom section of the top screen T10 may remain displayed on a new screen that appears after transition A user who selects any of the thumbnail images of the distribution channels T12 that are displayed, for example, on the top screen T10 illustrated in FIG. 5 can become a viewing user who views videos, as described above, and a user who selects the distribution preparation button T22 can become a distributing user who distributes videos.

Figure 6:
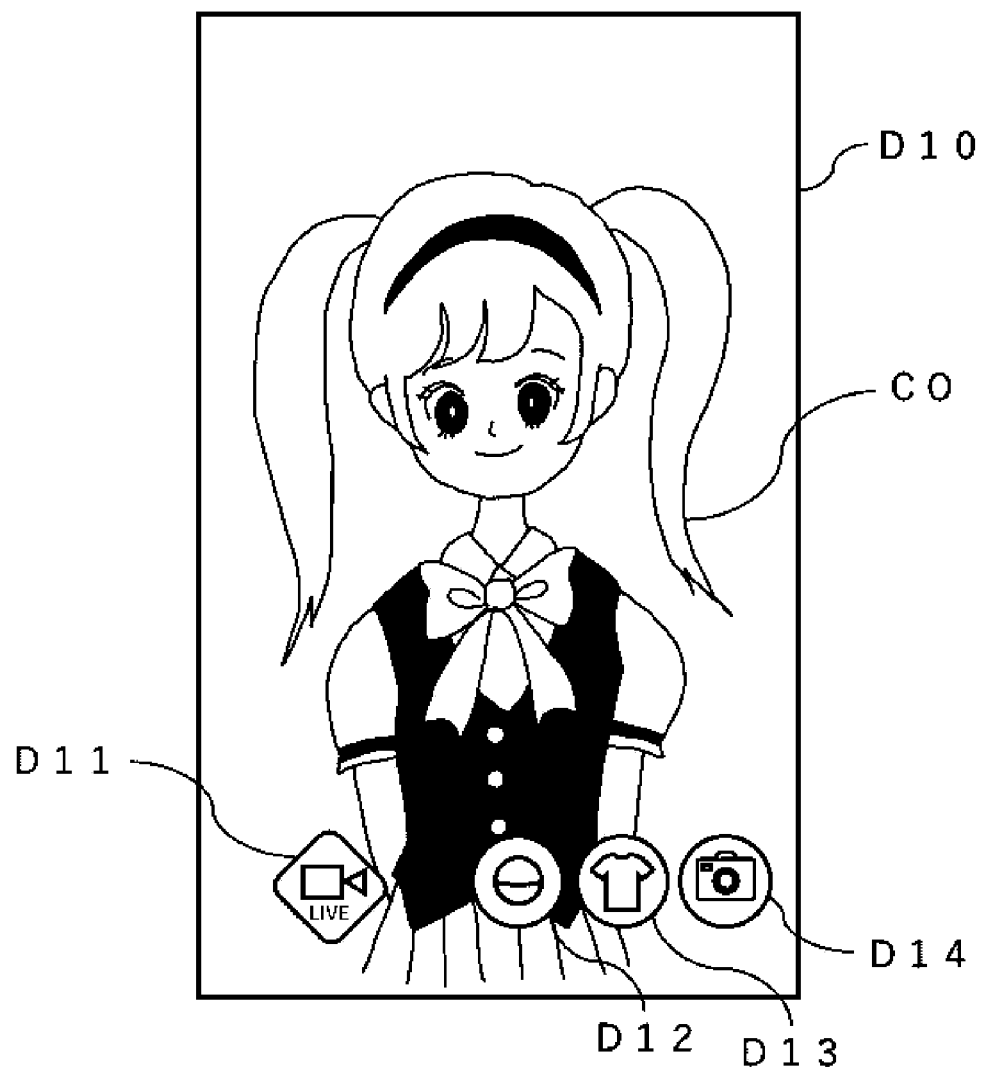
FIG. 6 illustrates another image of a screen displayed on a user terminal.

For example, selecting the distribution preparation button T22 on the top screen T10 illustrated in FIG. 5 enables transition to an avatar settings screen D10 illustrated in FIG. 6. Selecting a distribution button D11 on the avatar settings screen D10 enables transition to a distribution settings screen D20 illustrated in FIG. 7. Selecting a distribution start button D25 on the distribution settings screen D20 enables transition to an avatar distribution screen D30 illustrated in FIG. 8.

Next, a flow performed before start of video distribution will be described in detail.

One or more computer processors according to the embodiment of the present disclosure can include a distribution-start-request accepting unit, a distribution setting unit, and a distribution starting unit.

The distribution-start-request accepting unit accepts, from the distributing user terminal of the distributing user, a distribution start request to start distribution of a first video including an animation of a character object.

Here, the first video refers to a video including an animation of a character object. In the present specification, a character object may be referred to as an "avatar".

The distribution start request, described above, can be transmitted from the user terminal to the information processing apparatus 400 by selecting the distribution button D11 that appears, for example, on the avatar settings screen D10 transitioning from the top screen T10 displayed on the user terminal (which later becomes a distributing user terminal) where a dedicated application program (video distributing and viewing application program) for accessing the video distribution platform is running.

FIG. 6 illustrates an example of the avatar settings screen D10. The avatar settings screen D10 can display, for example, a character object CO, the distribution button D11, a gacha button D12, a dressing button D13, and a photo button D14.

When the dressing button D13 is selected by the user, a closet screen for selection of various avatar parts, such as the eyes, nose, mouth, hair, accessories, clothes, and background of the character object CO, is developed.

When the gacha button D12 is selected by the user, a lottery screen for getting the avatar parts is developed.

When the photo button D14 is selected by the user, a shooting screen for shooting a still image of the character object is developed.

When the distribution button D11 is selected by the user, a distribution start request is transmitted to the information processing apparatus 400.

In response to the distribution start request for the first video accepted by the distribution-start-request accepting unit, the distribution setting unit makes distribution settings for the first video on the basis of designation from the distributing user terminal 100.

Figure 7:
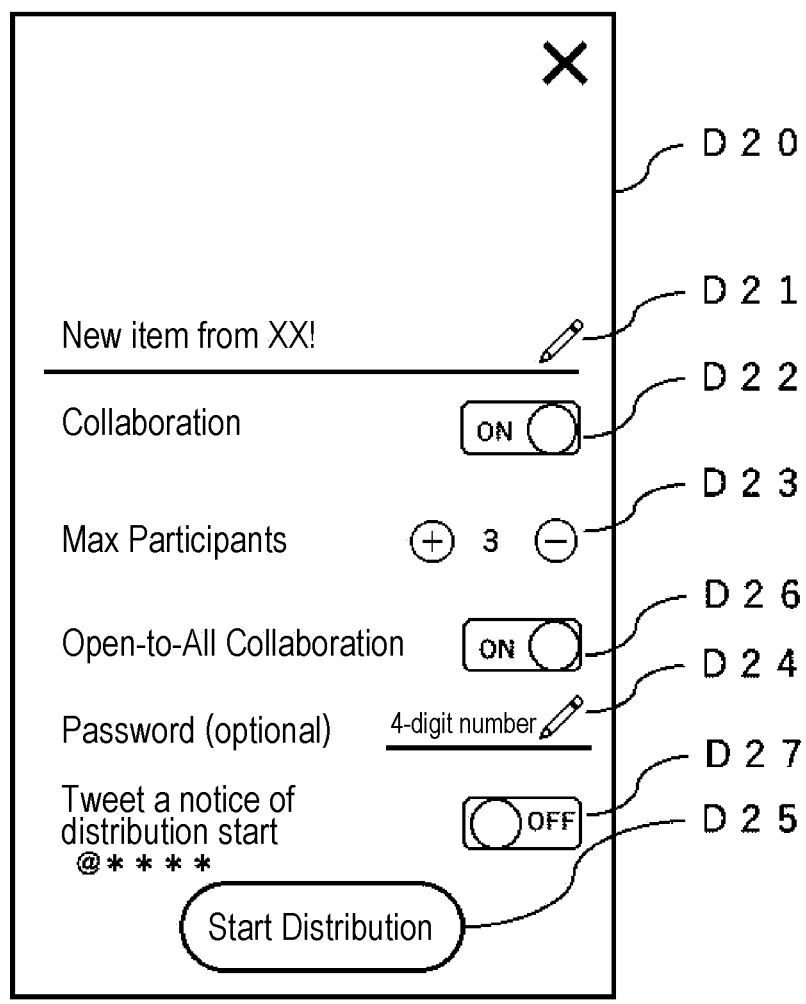
FIG. 7 illustrates another image of a screen displayed on a user terminal.

For example, selecting the distribution button D11 enables transition of a screen displayed on the distributing user terminal 100 from the avatar settings screen D10 illustrated in FIG. 6 to the distribution settings screen D20 illustrated in FIG. 7.

The distribution settings can include at least one of the setting related to the title of the first video, the setting about whether to allow other users to appear in the first video, the setting related to the number of persons who can appear in the first video, and the password-related setting.

These distribution settings can be made in a title setting field D21, a collaboration setting field D22, a participants setting field D23, and a password setting field D24 illustrated in FIG. 7. An open-to-all collaboration setting field D26 and an SNS post setting field D27 are also displayed in the example of FIG. 7.

The title of the first video can be freely determined by the distributing user within the maximum allowable character limit. When no input is received from the distributing user, a preset title including the name of the character object (distributing user), such as "New item from XX!", may be automatically determined.

The distributing user can freely determine whether to allow other users to appear in the first video. If allowed, other users can make an application to the distributing user for participation, whereas if not allowed, other users cannot make an application to the distributing user for participation. In the present specification, a situation where other users appear in a video distributed by the distributing user may be referred to as "collaboration". Details of the collaboration will be described later on below.

The number of users who can appear in the first video can be set only when other users are allowed to appear in the first video, and the distributing user can freely determine the number within the maximum allowable limit.

A password can be optionally set only when other users are allowed to appear in the first video. As the password, the distributing user can freely determine any number with a specified number of digits. When a user makes an application to participate in the first video, the user is requested to enter the password. The password setting field D24 may be activated only when the open-to-all collaboration setting field D26 is OFF.

On the basis of conditions set by the distribution setting unit, the distribution starting unit distributes information about the first video to the viewing user terminal 200 of the viewing user.

Selecting the distribution start button D25 illustrated in FIG. 7 enables transmission of an instruction to start the distribution.

For example, the distribution starting unit distributes information about a video (first video) including an animation of the character object of the distributing user (i.e., distributes an avatar) to the viewing user terminal 200 of the viewing user.

The information about the first video includes, for example, motion information representing the movement of the character object, audio information of the voice of the distributing user, and gift object information representing gifts sent from other viewing users. The gift object information includes at least gift object identification information specifying the type of a gift object, and position information indicating the position at which the gift object is displayed.

The distribution starting unit can thus distribute the video live through the distribution platform described above.

Figure 8:
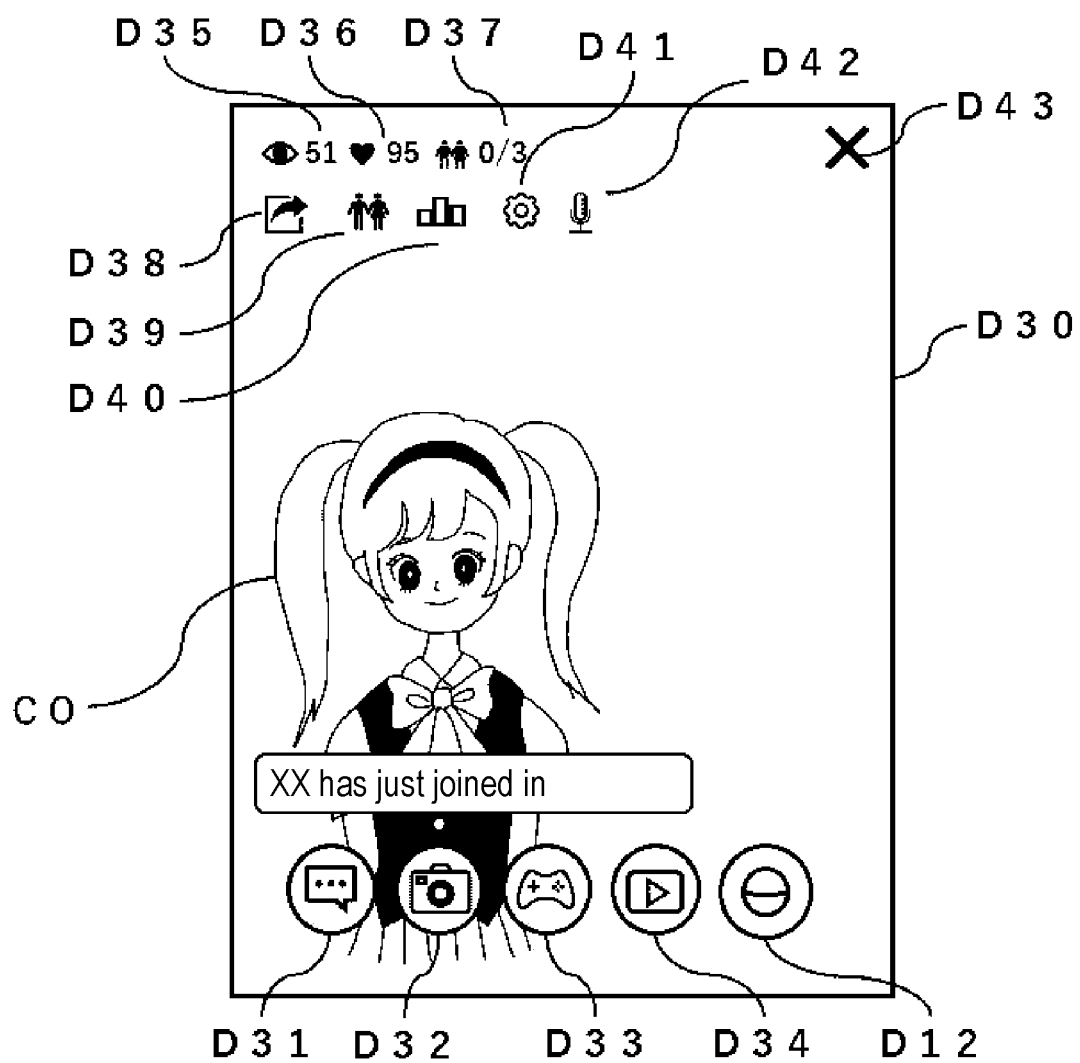
FIG. 8 illustrates another image of a screen displayed on a user terminal.

FIG. 8 illustrates the avatar distribution screen D30 displayed on the distributing user terminal 100.

The avatar distribution screen D30 can display not only the character object CO, but also a comment input button D31 used by the distributing user to enter a comment, a photo button D32 used to save a still image of the screen, a play start button D33 used to play a game (described below), an external service link button D34 used to view videos provided by external services, and the gacha button D12 used to obtain avatar parts.

Also, the upper part of the avatar distribution screen D30 can display a cumulative viewers indicator D35, a cumulative "likes" indicator D36, a collaborators count indicator D37, a share button D38 for sharing with external SNS, a guest details button D39, a ranking display button D40, a setting button D41, and an audio switching button D42 for switching audio ON and OFF. An end button D43 for ending the distribution is also displayed.

While details of the indicators and buttons mentioned above will not be described, selecting the setting button D41 makes it possible to change the distribution settings made on the distribution settings screen D20.

In the example illustrated in FIG. 8, the character object CO is displayed in the lower left part of the avatar distribution screen D30. This is because settings are made on the distribution settings screen D20 in such a way that other users can participate in the first video, and up to three persons can appear in the first video. That is, up to three character objects of other users can appear in an empty space on the avatar distribution screen D30.

The above is the description of a screen transition that takes place when avatar distribution according to the embodiment of the present disclosure is performed.

Next, a screen transition that takes place when the distributing user plays a game during distribution will be described.

One or more computer processors according to the embodiment of the present disclosure can include a game request accepting unit, a game video distributing unit, and a game display processing unit.

By selecting the play start button D33 during avatar distribution, such as that illustrated in FIG. 8, the distributing user can send a play start request to start a game.

The game displayed by selecting the play start button D33 can be a dedicated game included in an application program implemented by the information processing system according to the embodiment of the present disclosure, and differs from general-purpose games provided by external services. Therefore, game distribution according to the embodiment of the present disclosure may be distinguished from distribution of a play video of a general-purpose game that is provided by an external service along with a live commentary by the distributing user.

Alternatively, the play start request may be transmitted from the distributing user terminal 100 to the information processing apparatus 400 by selecting a play start button on a predetermined screen displayed on the distributing user terminal 100 of the distributing user.

Figure 9:
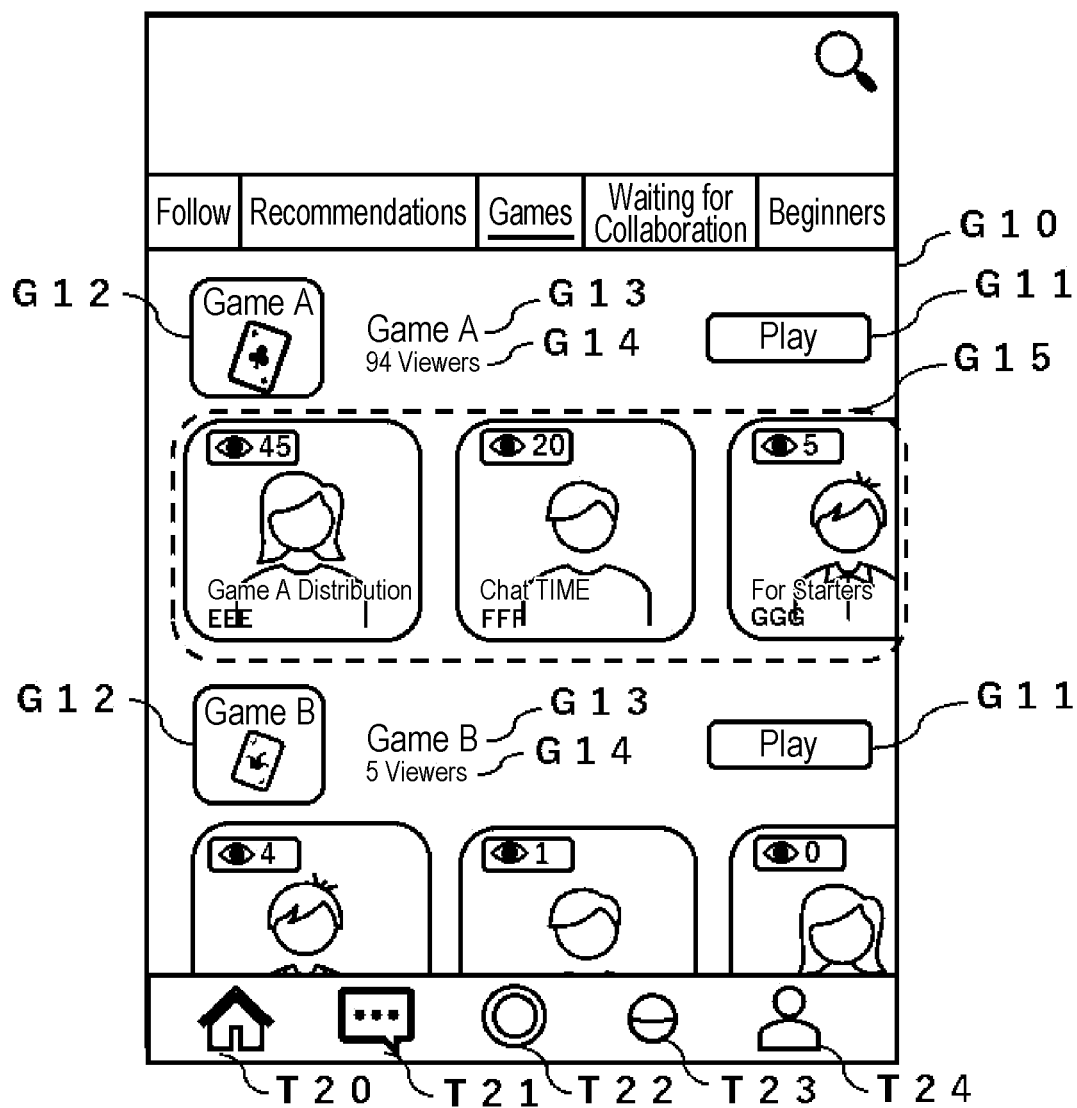
FIG. 9 illustrates another image of a screen displayed on a user terminal.

FIG. 9 illustrates an example of a screen G10 having a play start button G11 thereon and serving as the predetermined screen described above. The screen G10 illustrated in FIG. 9 is a screen displayed by selecting the Game tab T15 on the top screen T10 (FIG. 5) displayed on the user terminal where an application program implemented by the information processing system according to the embodiment of the present disclosure is running.

The screen G10 displays at least the play start button G11 used to transmit a play start request to start a predetermined game.

When the game request accepting unit accepts the play start request to start the predetermined game, the game video distributing unit distributes information about a second video to the viewing user terminal 200.

The second video is a play video of a predetermined game. In the present specification, performing a distribution in such a way as to display such a video on the screen of the viewing user terminal 200, is referred to as "game distribution".

After starting an application program implemented by the embodiment of the present disclosure, the user selects a play start object on a game list screen and a game details screen. Thus, as a distributing user, the user can transmit, to the information processing apparatus 2400, a distribution start request to start distribution of the second video.

The game list screen or the game details screen is a first screen to be described below in detail.

That is, the game display processing unit performs display processing on the first screen that includes a distribution start object with which a distribution start request can be transmitted, a play start object with which a play start request to start a predetermined game can be transmitted, and a video thumbnail image representing a play video of the predetermined game being distributed.

The screen G10 illustrated in FIG. 9 corresponds to the first screen (game list screen) described above. The first screen (game list screen) is a screen displayed by selecting the Game tab T15 on the top screen T10.

The first screen described above includes the distribution preparation button T22, which is the distribution start object, the play start button G11, which is a play start object, and thumbnail images each representing a video distribution channel.

For each of a plurality of games that can be played, the first screen displays the play start button G11, a game icon G12, a game name G13, the total number of viewers G14 of distribution channels of the game, and a distribution channel list G15 including thumbnail images of the distribution channels which distribute the game.

The order of the thumbnail images displayed in the distribution channel list G15 can vary for each viewing user. For example, the thumbnail images are arranged in descending order of the number of viewing users who follow and the number of views by the viewing users, descending order of the number of cumulative viewers, and chronological order of start of distribution, in this order of priority. The range of thumbnail images displayed in the distribution channel list G15 can be changed by horizontal scrolling.

As the games to be displayed on the game list screen, ten highest priority titles (described below) are loaded. The priorities are determined, for example, by whether it has been within 48 hours since the start of game distribution, the reverse chronological order of the last date when the viewing user played the game within 30 days, the order of priority of term IDs, and the descending order of the term IDs.

The distribution channel list G15 is updated when returning from another tab screen, as well as by an updating action (pull-to-refresh).

Figure 10:
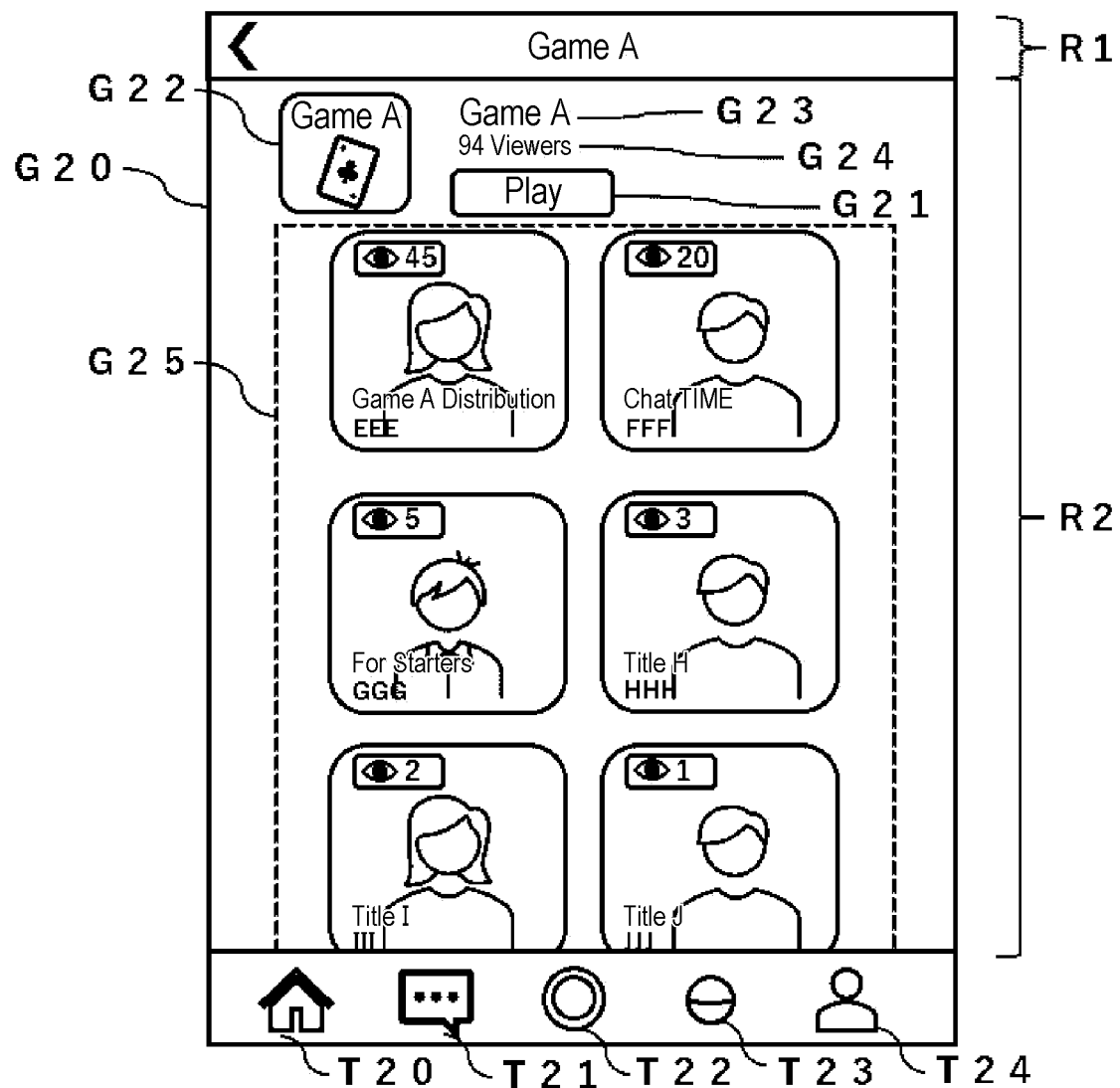
FIG. 10 illustrates another image of a screen displayed on a user terminal.

A screen G20 illustrated in FIG. 10 corresponds to the first screen (game details screen) described above. The first screen (game details screen) is a screen displayed by selecting the game icon G12 or the game name G13 displayed on the game list screen illustrated in FIG. 9.

The first screen includes the distribution preparation button T22, which is a distribution start object, a play start button G21, which is a play start object, and thumbnail images each representing a video distribution channel.

The first screen displays a game icon G22, a game name G23, the total number of viewers G24 of distribution channels of the game, and a distribution channel list G25 including thumbnail images of the distribution channels which distribute the game.

The order of the thumbnail images displayed in the distribution channel list G25 can vary for each viewing user. For example, the thumbnail images are arranged in descending order of the number of viewing users who follow and the number of views by the viewing users, descending order of the number of cumulative viewers, and chronological order of start of distribution, in this order of priority. The range of thumbnail images displayed in the distribution channel list G25 can be changed by vertical scrolling.

The distribution channel list G25 is updated when returning from another tab screen, as well as by an updating action (pull-to-refresh).

As described above, the user who has selected the distribution start object (distribution preparation button T22) or the play start object (play start button G11 or G21) becomes a distributing user who makes a distribution start request or a play start request.

The user who has selected a thumbnail image becomes a viewing user who views the second video.

The first screen includes a first region, which is unscrollable, and a second region, which is scrollable.

The first screen described here is one that is illustrated in FIG. 10. The first screen includes a first region R1 and a second region R2. Specifically, the first region R1 displays a game title, and the second region R2 displays the play start button G21, the game icon G22, the game name G23, the total number of viewers G24, and the distribution channel list G25. The first region R1 is a fixed unscrollable part of the display screen, whereas the second region R2 is a user-scrollable part of the display screen. Scrolling the second region R2 allows the user to see thumbnail images hidden off the screen.

Scrolling the second region R2 may cause the play start button G21 to be hidden off the screen. Therefore, the game display processing unit according to the embodiment of the present disclosure can display the play start object (play start button G21) in the first region R1 depending on how the play start object (play start button G21) is displayed in the second region R2.

Figure 11:
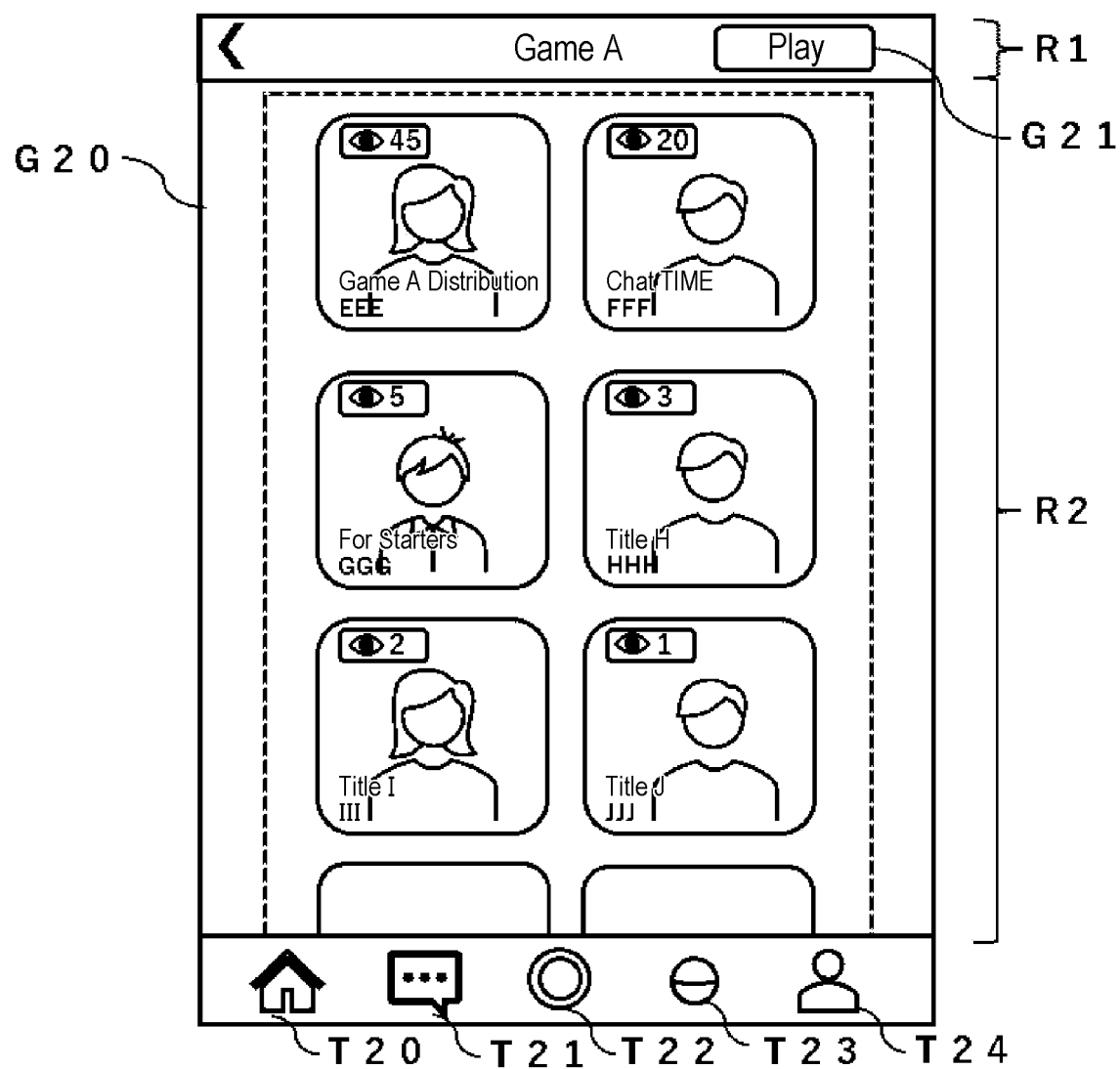
FIG. 11 illustrates another image of a screen displayed on a user terminal.

For example, the play start button G21 is displayed in the second region R2 in FIG. 10, but is displayed in the first region R1 in FIG. 11. That is, if part of or the entire play start button G21 is off the second region R2, the game display processing unit of the embodiment allows the play start button G21 to appear in the first region R1.

The game display processing unit of the embodiment may display the play start object in the first region R1 gradually depending on how the play start object is displayed in the second region R2.

Such presentation can be implemented by changing the transparency of the play start object in accordance with the amount of scrolling of the second region R2.

For example, the amount of scrolling 0 to 50 (in pixels) is made associated with the transparency 0.0 (completely transparent) to 1.0 (completely opaque) of the button. The play start object is completely transparent and cannot be viewed in the initial display state, but is completely displayed by scrolling 50 pixels or more. It is preferable, during the transition (from 0 to 50), that the transparency of the play start object be linearly changed. The amount of scrolling may be expressed in logical pixels, which differ from the actual pixels of the display.

After the game video distributing unit distributes information about the second video, the game request accepting unit can accept a play end request to end a predetermined game from the distributing user terminal 100.

The play end request can be transmitted by selecting an end button on the game screen.

When the game request accepting unit accepts the play end request to end the predetermined game, the distribution starting unit can end the distribution of the information about the second video and distribute information about the first video.

The information distributed here is the entire information about the first video, not part of the information about the first video.

Then, when the distribution starting unit ends the distribution of the information about the second video and distributes the information about the first video, a video displayed on the viewing user terminal 200 is the first video.

A flow performed to start viewing of a video will now be described.

One or more computer processors according to the embodiment of the present disclosure may further include a viewing accepting unit.

The viewing accepting unit accepts a video viewing request from the user.

In response to the viewing request, the distribution starting unit distributes, as video information, picture- and audio-related information to the information processing terminal of the user.

Figure 12:
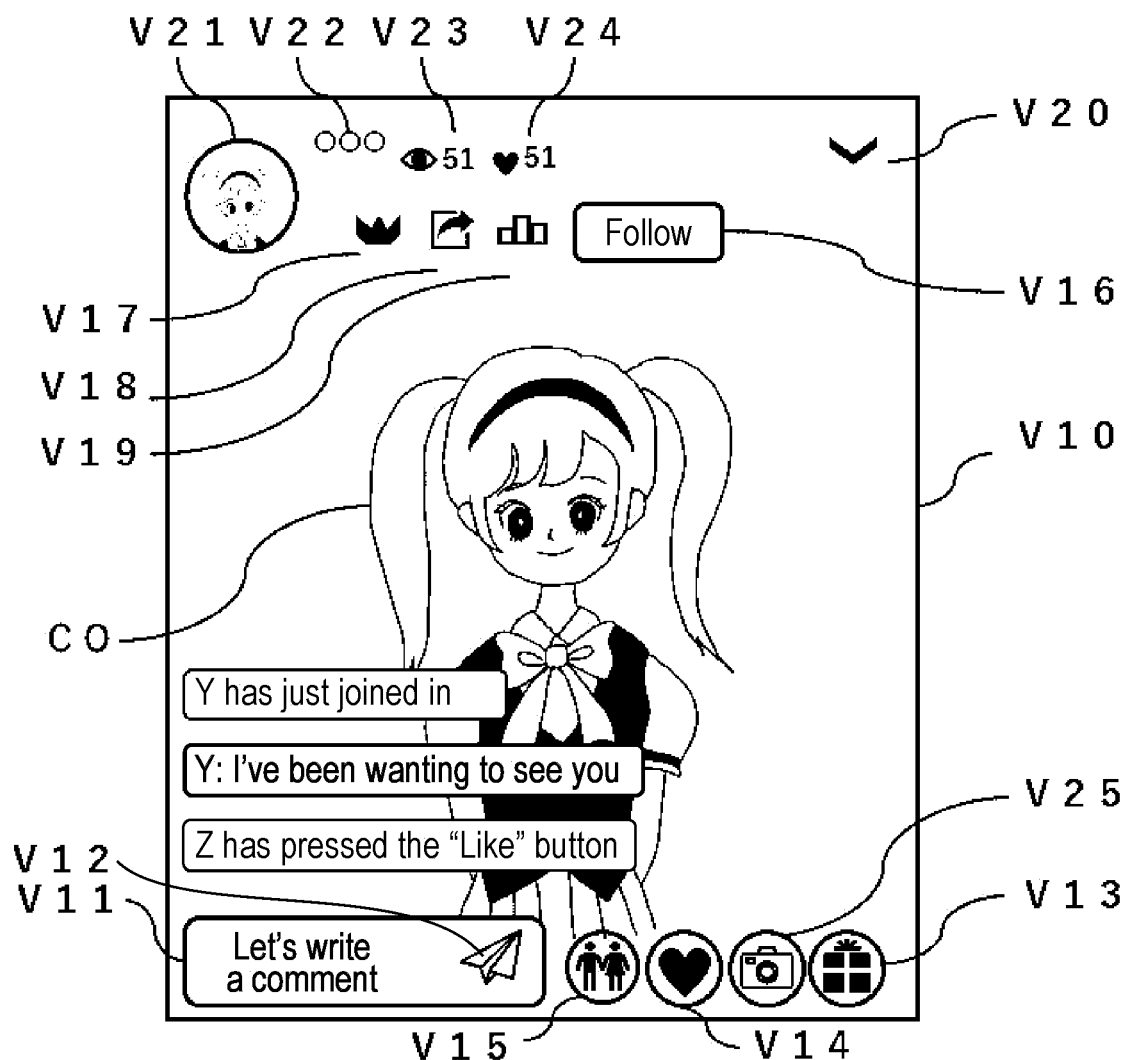
FIG. 12 illustrates another image of a screen displayed on a user terminal.

FIG. 12 illustrates an example of a viewing screen V10 for viewing an avatar video displayed on the viewing user terminal 200.

The viewing user can post a comment by entering text in a comment entry field V11 and pressing a send button V12.

Pressing a gift button V13 displays a list of gifts (or screen V30 in FIG. 13) to the viewing user. This allows the viewing user to specify a gift by selecting it from the list and send a gift display request to display the gift.

One or more computer processors according to the embodiment of the present disclosure may include a determining unit. The determining unit determines whether the gift display request has been received from the viewing user terminal 200.

The display request may include gift object information. The gift object information includes at least gift object identification information that specifies the type of a gift object and position information that indicates the position at which the gift object is displayed.

Figure 13:
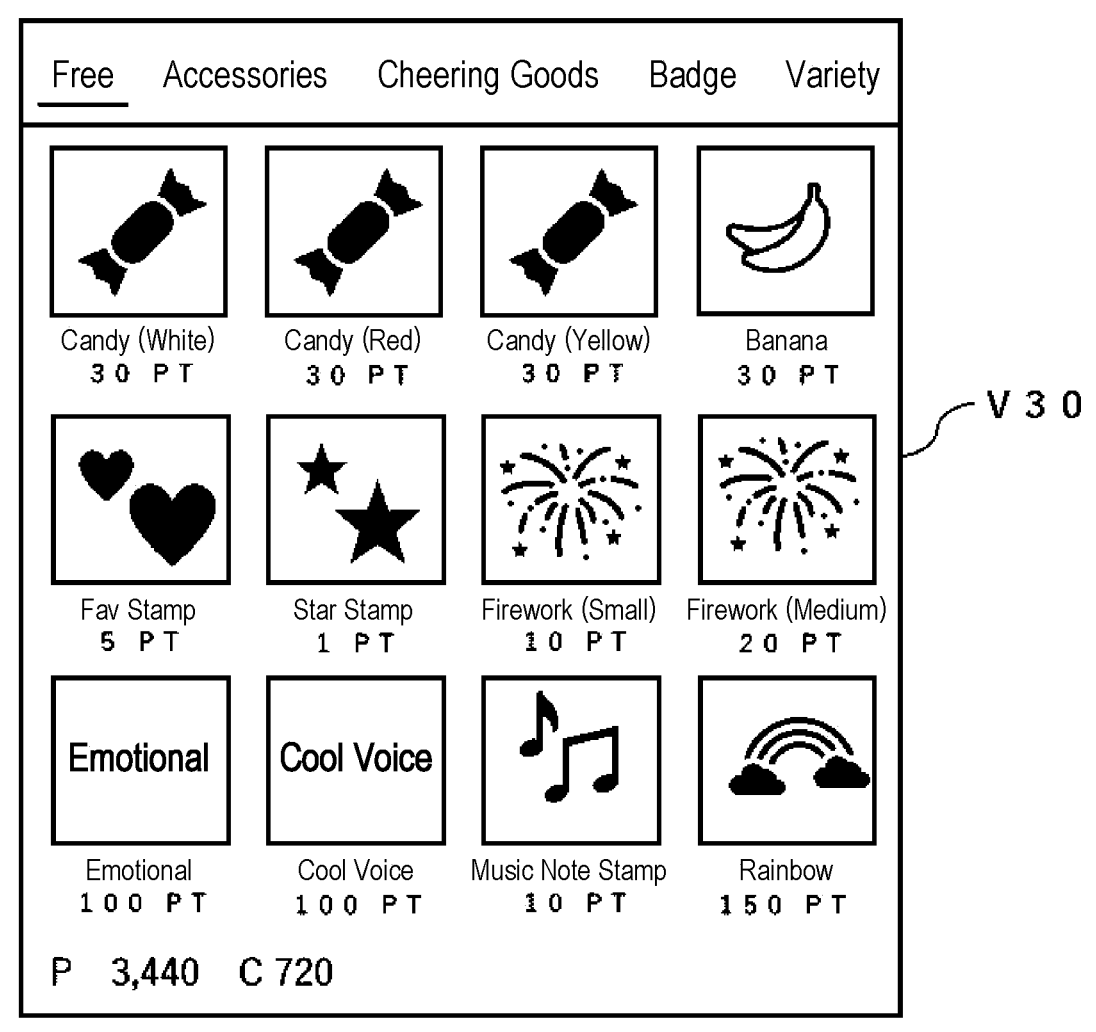

As illustrated in FIG. 13, gifts can be displayed by category (e.g., free (or purchasable) gifts, accessories, cheering goods, badge items, and variety goods).

The purchasable gifts are gifts (coin gifts) that can be purchased by using "my coins" purchased by the viewing user. The free gifts are gifts (point gifts) that can be obtained either with or without "my points" obtained by the viewing user for free.

The term "gift" used in the present application has a concept similar to that of the term "token". Accordingly, the technology described in the present application can also be understood by replacing the term "gift" with the term "token".

Pressing a "Like" button V14 allows the viewing user to post a positive evaluation. A button for posting feelings or negative evaluations may be displayed in addition to, or in place of, the "Like" button V14.

If the distributing user makes a distribution setting that allows other users to appear in the video, an application to participate in the video can be transmitted by selecting a collaboration application button V15.

If the viewing user has yet to follow the distributing user, a "follow" button V16 that allows the viewing user to follow the distributing user is displayed on the screen for a video distributed by the distributing user. If the viewing user already follows the distributing user, the "follow" button V16 described above functions as a "follow" cancellation button on the screen for a video distributed by the distributing user.

The "follow" may take place in the direction from a viewing user to another viewing user, from a distributing user to a viewing user, or from a distributing user to another distributing user. The "follow" is managed as a one-way association, and an association in the opposite direction is managed separately.

A photo button V25 for saving a still image of the screen can also be displayed.

The viewing screen V10 also displays a support ranking display button V17, a share button V18, and a ranking display button V19.

The support ranking shows a ranking of viewing users who support the distributing user. The ranking can be calculated in accordance with the gift value (e.g., points, coins).

For sharing a video, pressing the share button V18 allows the viewing user to view a list of social networking services (SNS) with which the video can be shared. This allows the viewing user to specify an SNS by selecting it from the list and send a permanent link to the location designated by the SNS.

Pressing the collaboration application button V15 can make a request to the distributing user for collaboration distribution. The collaboration distribution involves allowing the character object of the viewing user to appear in the distribution video distributed by the distributing user.

The upper part of the viewing screen V10 can display a distributing user icon V21, a distributing user name (character object name) V22, a cumulative viewers indicator V23, and a cumulative "likes" indicator V24.

Selecting a viewing end button V20 develops a screen for ending the viewing, and enables transmission of a viewing end request.

The screen for ending the viewing will now be described in detail. Such a screen is for "picture-in-picture audio distribution" which allows viewing while playing only audio without displaying a video image.

Selection of the viewing end button V20 is accepted as a video viewing end request by the viewing accepting unit.

The distribution starting unit ends the distribution of the picture-related information in response to the viewing end request, but does not end the distribution of audio-related information.

When picture- and audio-related information is distributed to the user terminal, a picture is displayed on the main screen of the user terminal, whereas when only audio-related information is distributed, no picture is displayed and a sub-screen showing that a video is being viewed is displayed on the user terminal.

Figure 14:
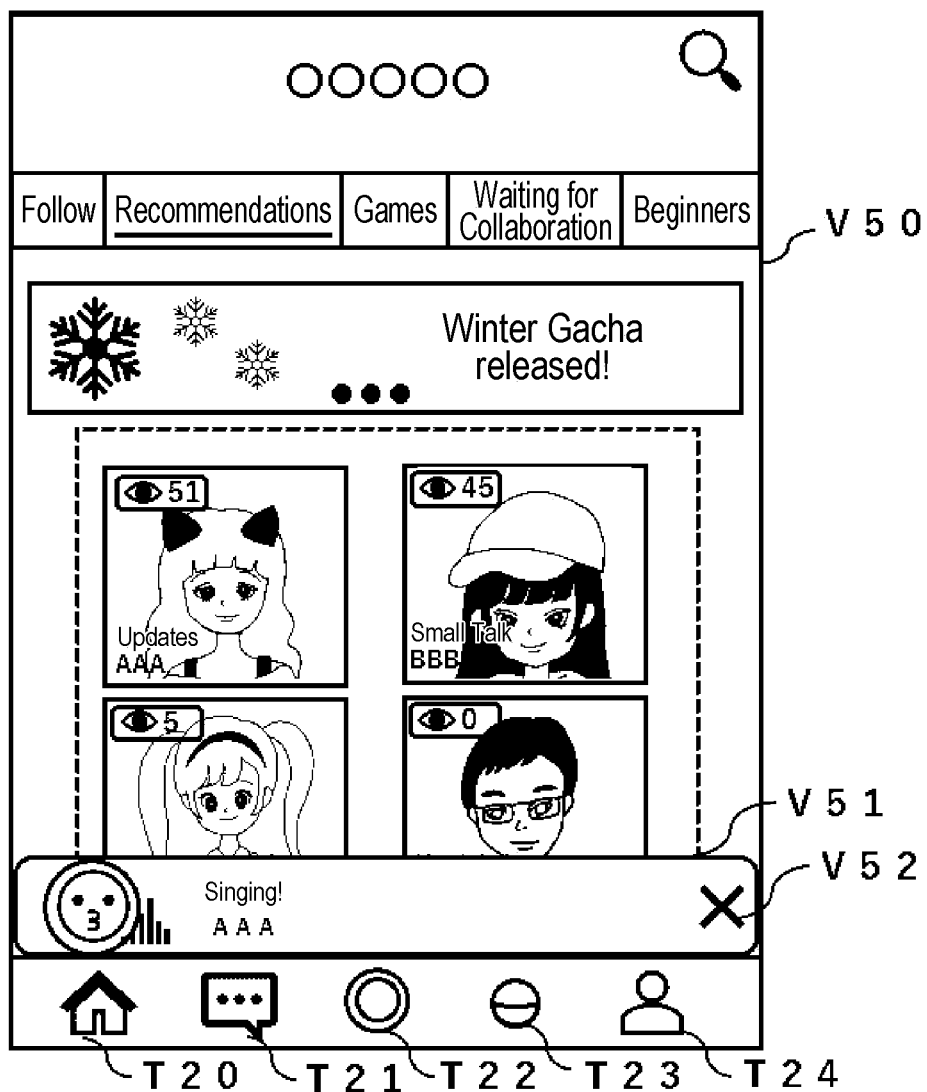
FIG. 14 illustrates another image of a screen displayed on a user terminal.

FIG. 14 illustrates an image of a screen V50 on which a sub-screen V51 is displayed.

When the sub-screen V51 is displayed, the main screen displayed in the background transitions to a screen that has been displayed before the start of video viewing. For example, in the case of transition from the Recommendations tab to a viewing frame, the display returns to the Recommendations tab, and in the case of transition from the Follow tab to the viewing frame, the display transitions to the Follow tab.

When the sub-screen V51 is being displayed, the main screen is operable and can transition to another screen.

The sub-screen V51 displays a profile image, a name, a title, and an audio icon which allows the user to visually identify that audio is being played.

Selecting an end icon V52 displayed on the sub-screen V51 can completely end the viewing.

The display of a picture may end by not displaying information transmitted from the server apparatus and received by the terminal, or may end by stopping the transmission of information from the server apparatus.

This configuration makes it possible to search for other distribution services or enjoy chatting with other users while listening to audio.

"Collaboration" will now be described, in which other users appear in a video distributed by the distributing user.

The viewing user can send a request to participate in the video through a confirmation screen for making a collaboration distribution participation request. The confirmation screen is displayed by pressing the collaboration application button V15 illustrated in FIG. 12.

In response to the participation request accepted, a collaboration avatar display unit included in one or more computer processors according to the embodiment of the present disclosure displays, in the video, a character object generated on the basis of movement of the viewing user who has made the participation request.

Figure 15:
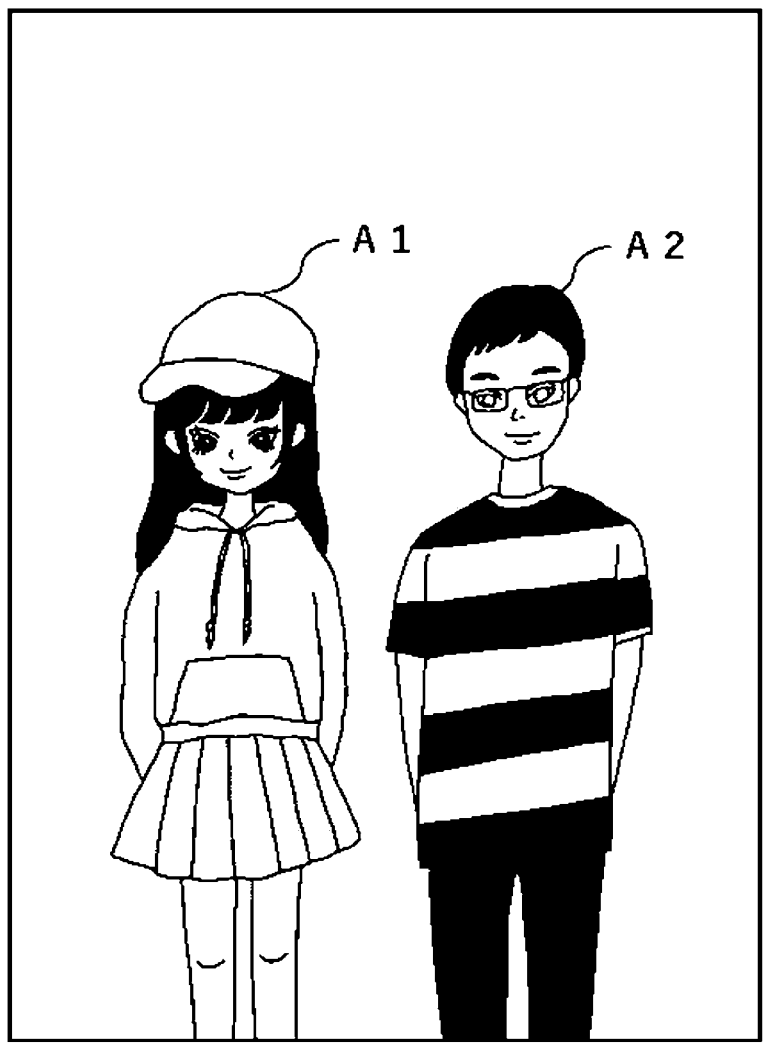
FIG. 15 illustrates another image of a screen displayed on a user terminal.

FIG. 15 illustrates an example of a viewing or distribution screen where a second avatar A2 participates in a video in which a first avatar A1 is displayed. The first avatar A1 is a character object of a host user, and the second avatar A2 is a character object of a guest user. FIG. 15 shows no objects other than the avatars.

Figure 16:
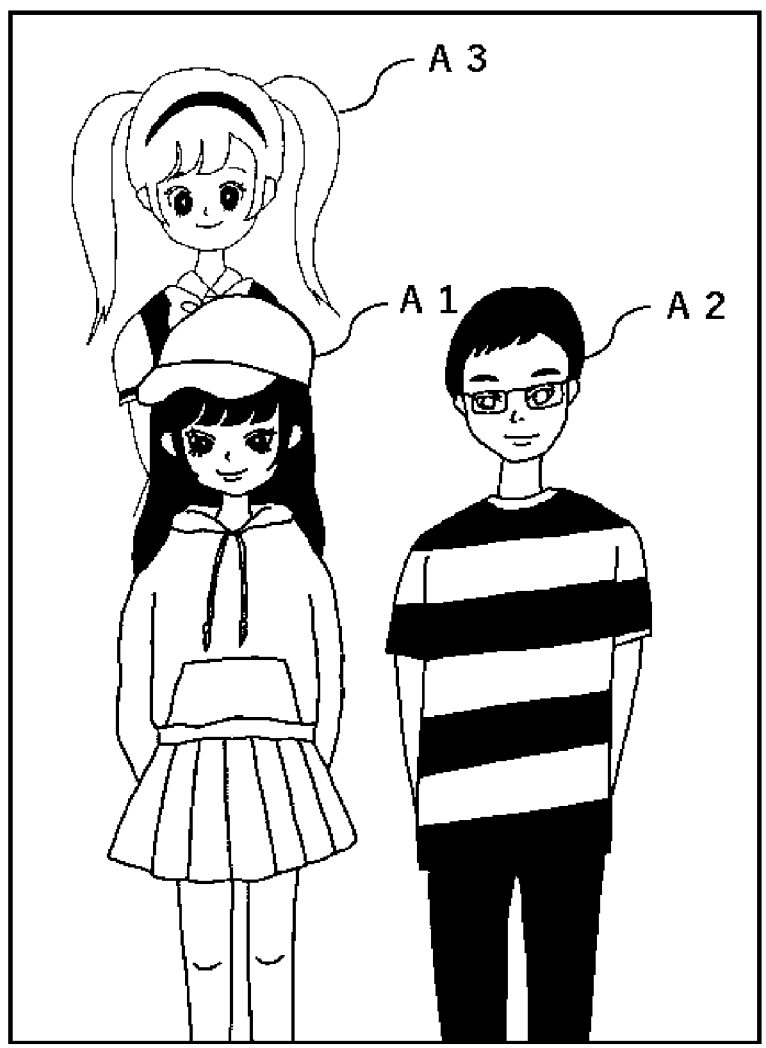
FIG. 16 illustrates another image of a screen displayed on a user terminal.

As illustrated in FIG. 16, a third avatar A3 may participate in the video. The third avatar A3 is a character object generated on the basis of movement of another viewing user. Although the third avatar A3 is placed behind the first avatar A1 and the second avatar A2 in FIG. 16, these three avatars may be placed side by side. The positions of the avatars may be specified by the distributing user.

Figure 17:
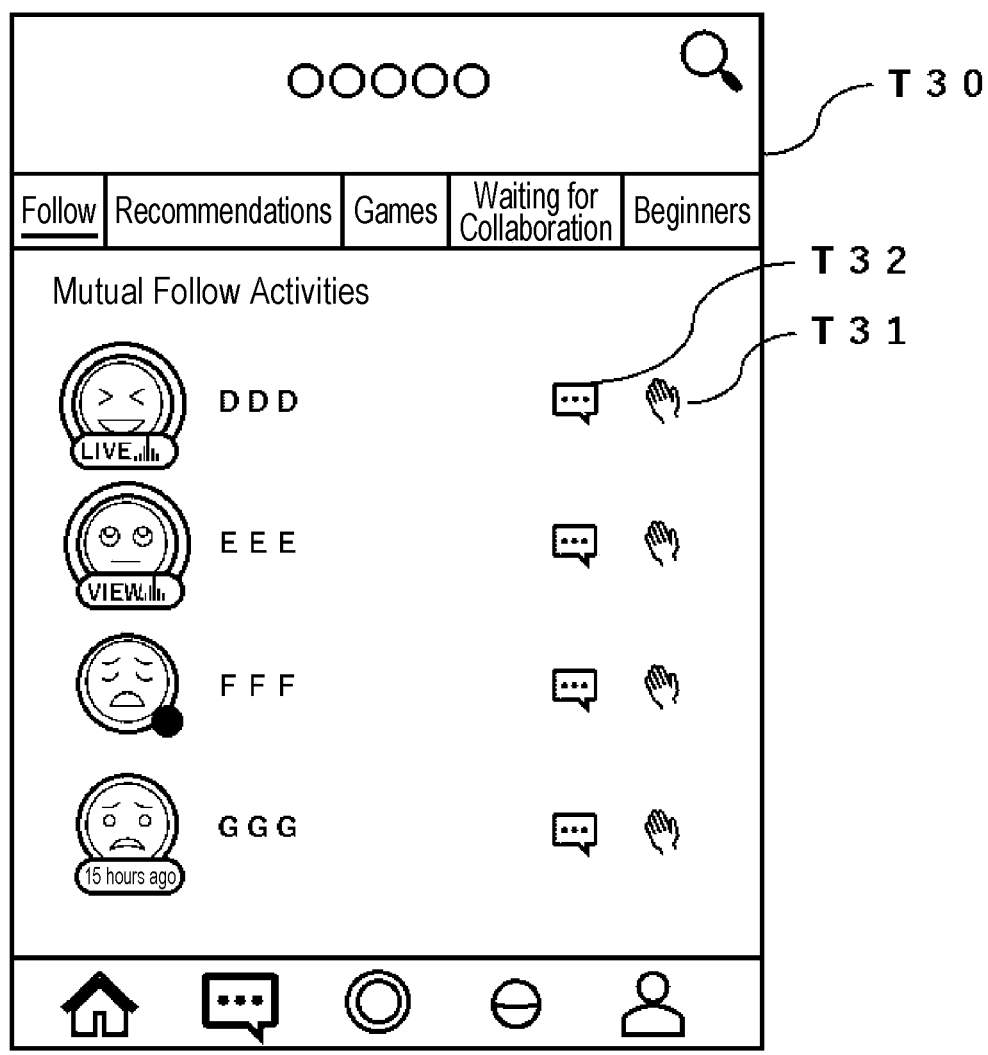
FIG. 17 illustrates another image of a screen displayed on a user terminal.

FIG. 17 illustrates a list screen T30 displayed by selecting the Follow tab on the top screen illustrated in FIG. 5. The list screen T30 displays a list of users having a mutual follow relation. That is, the users listed on the list screen T30 follow each other.

The list screen T30 displays the profile images and the names of the users having the mutual follow relation.

As illustrated in FIG. 17, the list screen T30 displays a first object T31 for each of the users having the mutual follow relation. A chat object T32 may also be displayed together with the first object T31. Selecting the chat object T32 enables transition to an individual chat screen for chatting with another user.

Selecting the first object T31 enables transmission of a predetermined notification to a terminal of a user associated with the first object T31.

The predetermined notification is, for example, a call notification.

Next, various functions that can be executed in the distributing user terminal 100, the viewing user terminal 200, and/or the server apparatus 400 included in the information processing system 3000, according to the embodiment of the present disclosure, will be described with reference to the drawings.

Figure 18:
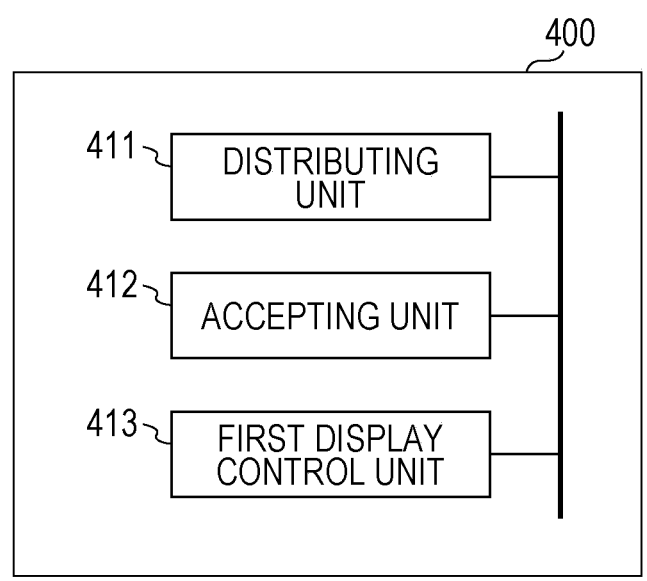
FIG. 18 illustrates a functional configuration of a server apparatus according to an embodiment of the present disclosure.

One or more computer processors included in the information processing system 3000 according to the embodiment of the present disclosure include, as illustrated in FIG. 18, a distributing unit 411, an accepting unit 412, and a first display control unit 413.

The distributing unit 411 transmits, to the viewing user terminal 200, information about a video including a character object that behaves on the basis of movement of the distributing user, so as to display the video on the viewing user terminal 200.

The distributing unit 411 functions as the distribution starting unit described above. The details are as described above.

The accepting unit 412 accepts operation information from the distributing user terminal 100.

The operation information includes first operation information and second operation information (described below).

The operation information may include screen operation information about operations performed by the distributing user on the screen of the distributing user terminal 100 during distribution. The screen operation information includes operations (e.g., comment entry, still image shooting, gameplay, sharing, and gacha) performed on various buttons, such as those displayed on the avatar distribution screen D30. The accepting unit 412 can also accept operation information which is a predetermined gift and/or comment display request from the viewing user terminal 200.

The first display control unit 413 controls display of the video (or performs display control on the video) in accordance with the operation information accepted by the accepting unit 412.

Performing display control on the video includes, for example, producing a predetermined effect on the video. For example, if at least part of display within the video is different before and after the predetermined effect is produced, then it means that the predetermined effect has been produced on the video.

Specifically, the first display control unit 413 performs display control on the video in response to accepting the first operation information from the distributing user terminal 100.

The first operation information is, for example, information transmitted from the distributing user terminal 100 in response to a distributing user's operation on a first operation object displayed on the screen of the distributing user terminal 100.

Figure 19:
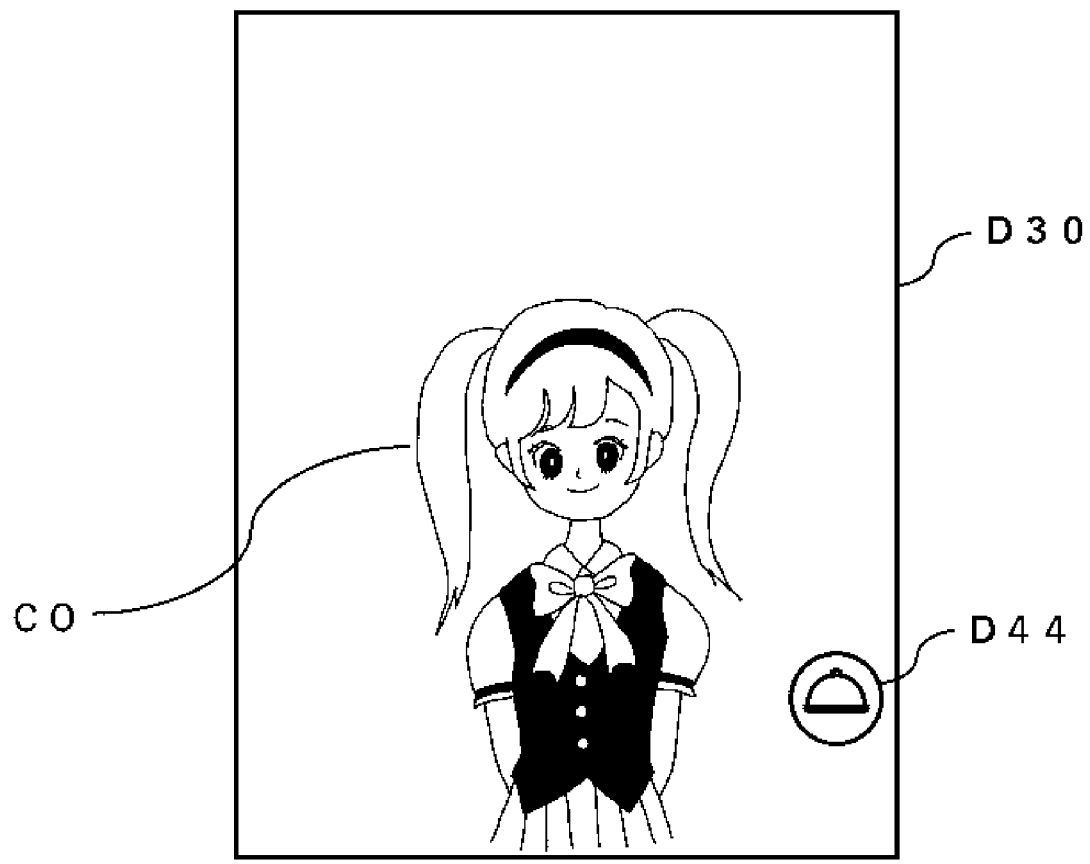
FIG. 19 illustrates an image of a screen displayed on a user terminal.

As illustrated in FIG. 19, the first operation object is, for example, a cover button D44 displayed on the avatar distribution screen D30. For simplicity, FIG. 19 does not show various operation interfaces (UIs) and information indications, such as those illustrated in FIG. 8.

The way in which the first operation object is displayed (e.g., position, shape, and design) is not particularly limited. The first operation object can be displayed in such a way as to allow a direct or indirect understanding that display control (e.g., producing a predetermined effect) is performed on the video by selecting the first operation object.

For example, a user's operation on the first operation object can be a selecting operation of selecting the cover button D44. Examples of the selecting operation include, but are not limited to, tapping or double-tapping on the screen. The selecting operation may be performed by voice or eye movement.

With this configuration, the timing of performing display control on the video can be determined by intention of the distributing user.

Alternatively, the first display control unit 413 performs display control on the video in response to not accepting, by the accepting unit 412, the second operation information from the distributing user terminal 100 for a predetermined period of time.

The second operation information is information from the distributing user terminal 100, such as audio information and/or motion information for moving the character object.

The audio information may be, for example, audio data based on voice of the distributing user. Audio received from the distributing user terminal 100 may include sounds other than the voice of the distributing user (e.g., voice of other people therearound, background music (BGM), interphone sound, phone ringtone, sound of trains and vehicles, voice of rail station announcement, and noise). In this example, only audio data based on voice of the distributing user may be treated, by using known voice recognition technology, as the second operation information.

An example of the situation where no audio information is accepted is when the distributing user says nothing.

Another example of the situation where no audio information is accepted is when an audio acquisition function of the distributing user terminal 100 is turned off by a distributing user's operation. For example, the audio acquisition function is off when audio has been turned off by selecting the audio switching button D42 on the avatar distribution screen D30 illustrated in FIG. 8.

The motion information may be, for example, tracking data of the distributing user. The tracking data includes tracking data of the face and/or body of the distributing user.

An example of the situation where no motion information is accepted is when the distributing user is not present in front of the distributing user terminal 100 (i.e., not present in the area where shooting with a camera on the distributing user terminal 100 is possible).

Another example of the situation where no motion information is received is when a motion acquisition function is off. For example, the motion acquisition function is off when the screen of another application program is open on the distributing user terminal 100 (i.e., avatar distribution in an application program according to the embodiment of the present disclosure is running in the background).

As described above, there are situations where the accepting unit 412 does not accept the second operation information from the distributing user terminal 100 for a predetermined period of time. Various situations are expected to occur by combining the examples of the audio information and/or motion information described above, but the situation is not particularly limited to any of the examples.

With this configuration, display control is automatically performed on the video and this eliminates the need for operation by the distributing user.

As display control, the first display control unit 413 according to the embodiment of the present disclosure applies a predetermined presentation effect to a character object included in the video, or displays a presentation screen including a predetermined character image related to the character object.

Details of the display control will now be described.

First, an example of the display control in which the first display control unit 413 applies a predetermined presentation effect to a character object included in the video will be described.

For example, the predetermined presentation effect is to display, in association with the character object in a motionless state, an object for showing the viewing user that the character object is not behaving on the basis of movement of the distributing user.

Examples of such an object include a soul object OB1 (see FIG. 20) representing a soul that is leaving the character object. The absence of a soul means that the spirit is not here or, in other words, the user represented by the character object is absent (or unable to respond). Displaying the soul object OB1 allows the viewing user to understand the reason for which the character object is motionless.

Another example of such an object may be a placard object OB2 (see FIG. 21) indicating that the user is absent. The placard object OB2 shows a text message, such as "I will be back soon!", indicating that the user represented by the character object is absent. Displaying the placard object OB2 allows the viewing user to clearly understand the reason for which the character object is motionless.

Figure 20:
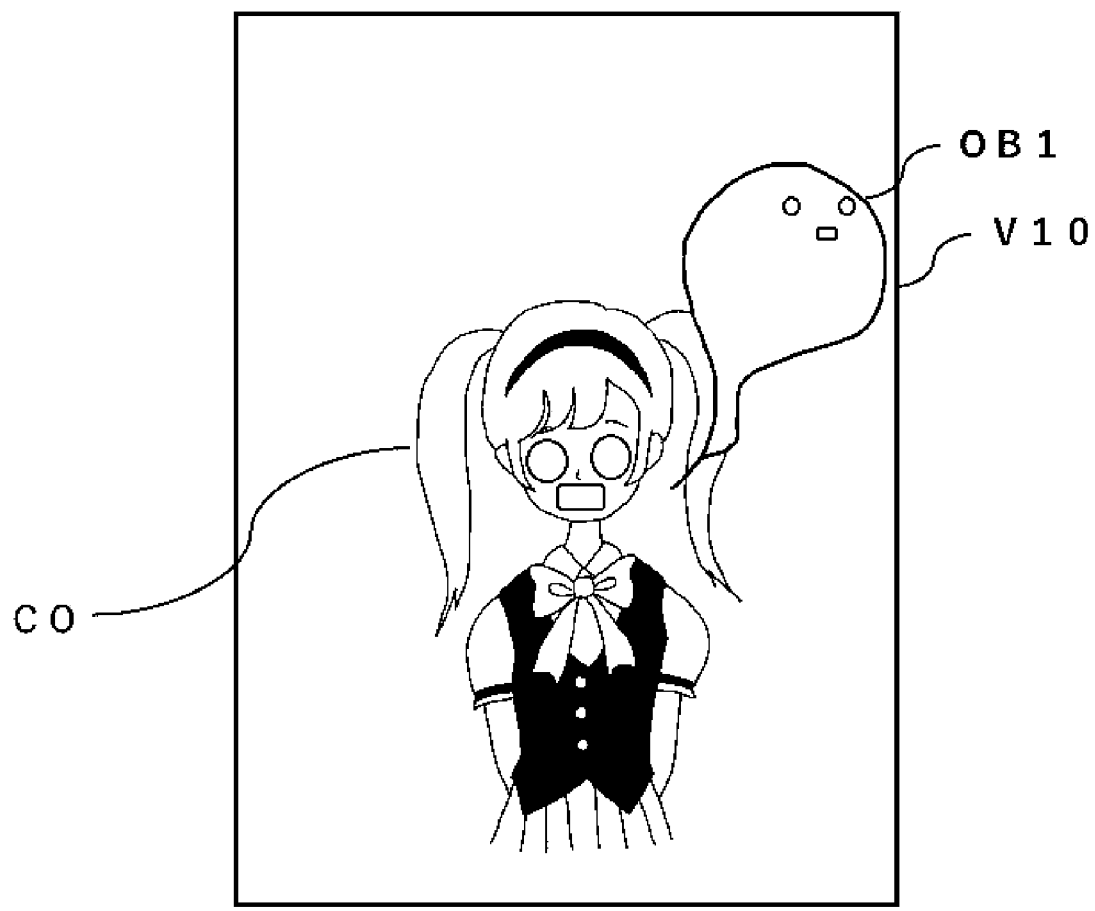
FIG. 20 illustrates another image of a screen displayed on a user terminal.
Figure 21:
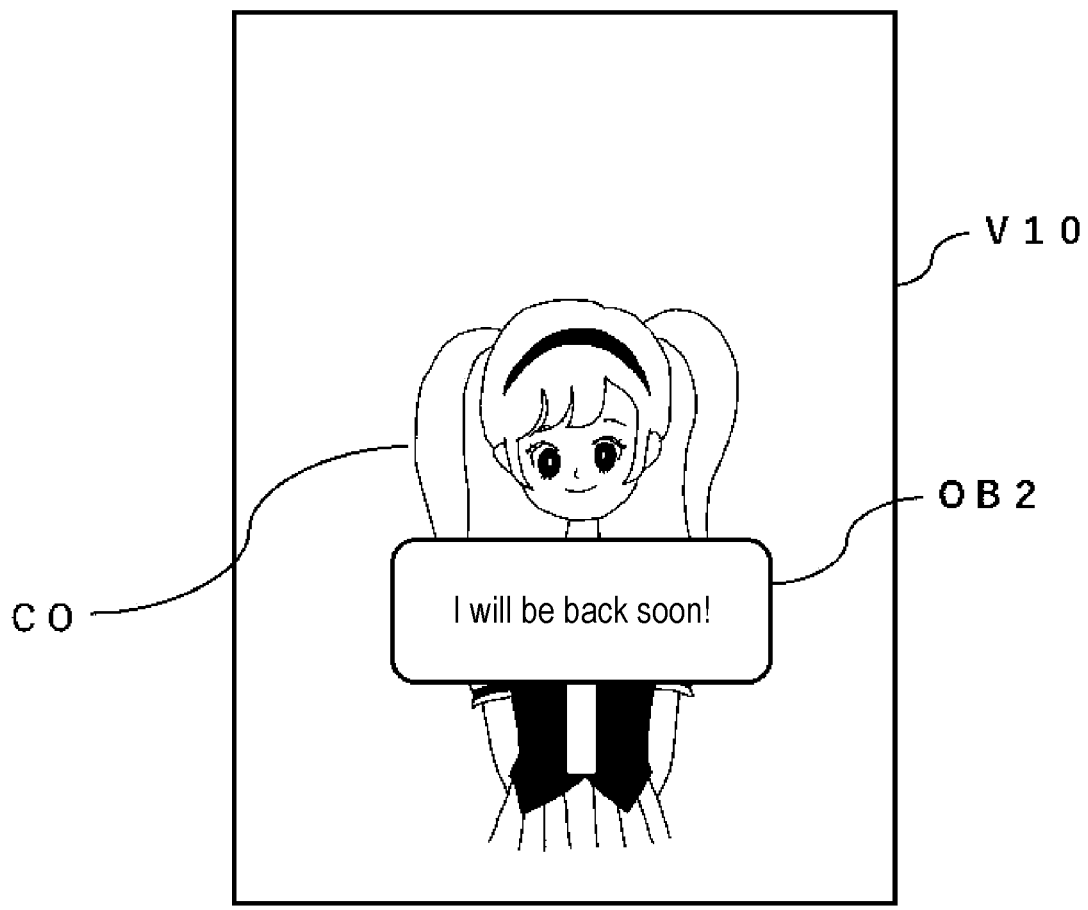
FIG. 21 illustrates another image of a screen displayed on a user terminal.
Figure 22:
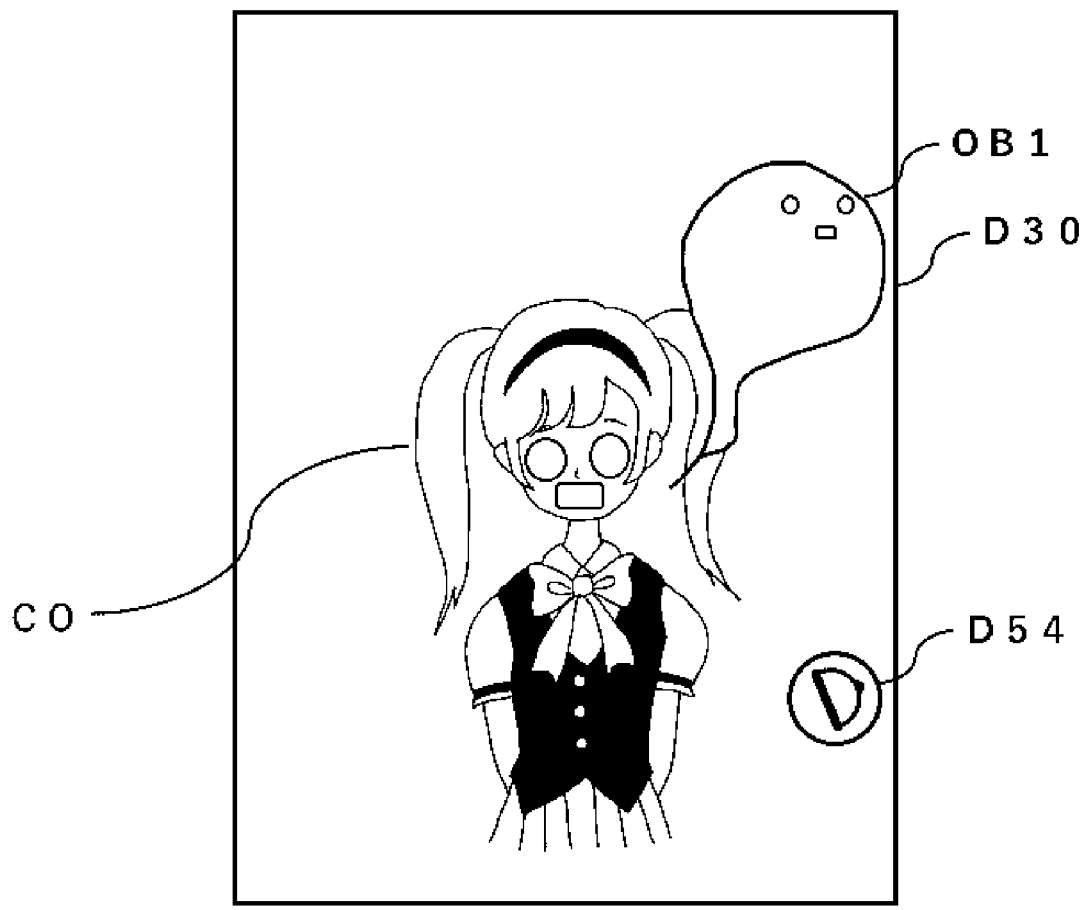
FIG. 22 illustrates another image of a screen displayed on a user terminal.

FIG. 20 and FIG. 21 each illustrate the viewing screen V10 displayed on the viewing user terminal 200. For simplicity, FIG. 20 and FIG. 21 do not show various operation UIs and information indications, such as those illustrated in FIG. 12. Similarly, FIG. 22 illustrates the avatar distribution screen D30 displayed on the distributing user terminal 100. Again, for simplicity, FIG. 22 does not show various operation UIs and information indications, such as those illustrated in FIG. 8.

A display-controlled video presented to the viewing user can be the same as that presented to the distributing user.

The character object in a motionless state can be a character object fixed upon acceptance of the first operation information, or a character object fixed upon subsequent acceptance of the second operation information.

It is also possible to apply, for example, predetermined posing or motion to the character object. Details of such application will be described later on below.

Next, an example will be described in which, as display control, the first display control unit 413 displays a presentation screen including a predetermined character image related to the character object.

Figure 23:
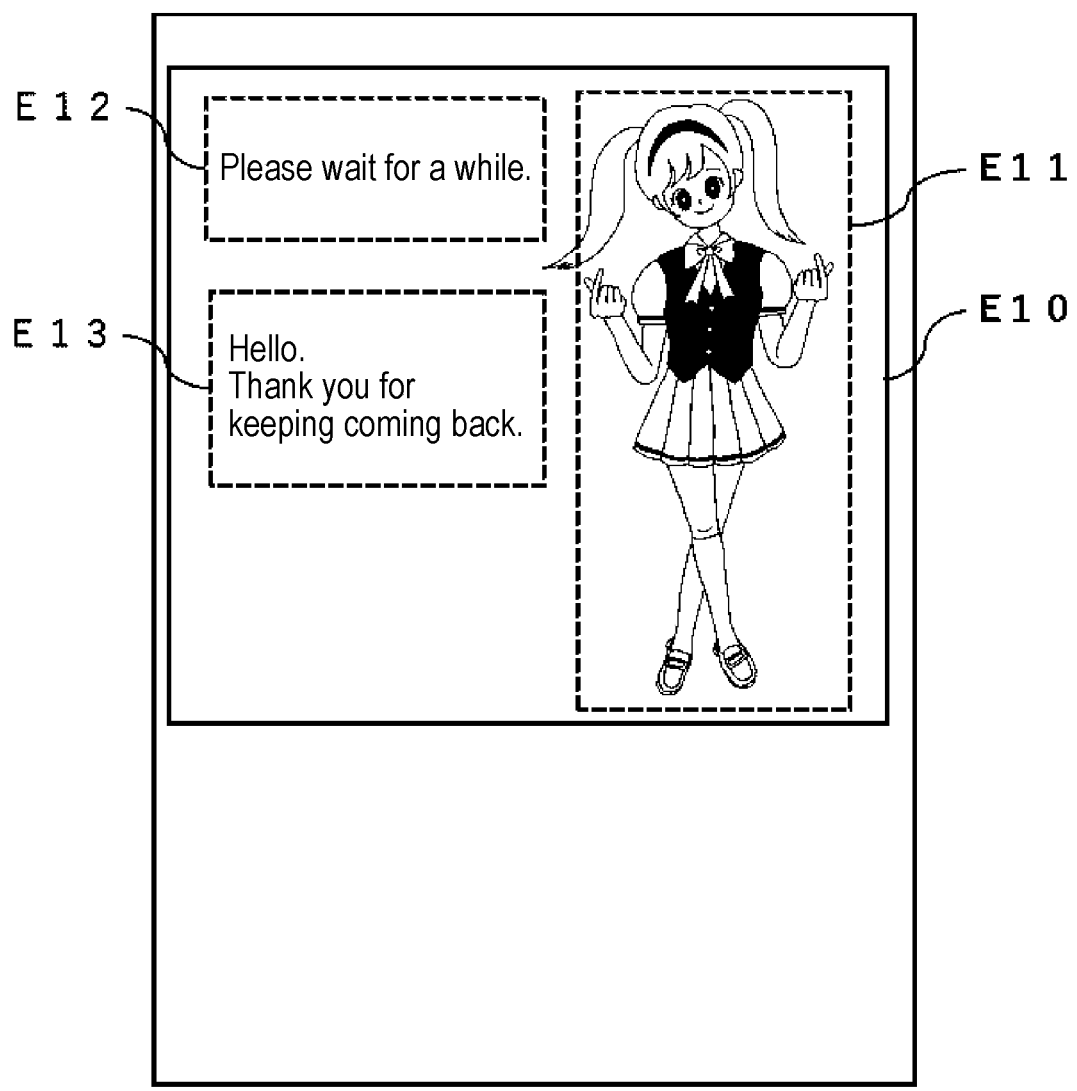
FIG. 23 illustrates another image of a screen displayed on a user terminal.

FIG. 23 illustrates an image of a presentation screen E10. For example, the presentation screen E11) can display an image display field E11 for displaying a predetermined character image, a first display field E12, and a second display field E13. The screen illustrated in FIG. 23 is an example of a screen that includes a character image to which finger heart posing (motion) is applied.

For example, the predetermined character image, described above, is a two-dimensional version of the character object or a smaller-sized version of the character object, and does not behave on the basis of movement of the distributing user.

The smaller-sized version of the character object may be one that with a modified head-body balance. For example, the smaller-sized version of the character object may be a chibi (or small) avatar whose head and body parts have equal proportions. The chibi avatar may either be 2D or 3D.

For example, the first display field E12 can display a text message and/or image indicating that the user is absent, and the second display field E13 can display part of the user's profile. In the example illustrated in FIG. 23, the first display field E12 displays a text message "Please wait for a while".

The contents displayed in the first display field E12 and the second display field E13 may be set by the user. The details will be described later on below.

The presentation screen E10 may display a still image, or an image in which only a predetermined character image is moved, for example, by graphics interchange format (GIF) animation. The presentation screen E11) may be displayed in place of, or superimposed on, the video described above.

The screen illustrated in FIG. 23 is applicable to both the viewing screen V10 and the avatar distribution screen D30.

As described above, a screen where, as display control, a predetermined presentation effect is applied to the character object included in the video, or where, as display control, a presentation screen including a predetermined character image related to the character object is displayed, is referred to as a "cover picture" (substitute painting or custom thumbnail) in the embodiment of the present disclosure. The cover picture generally refers to a still image displayed in response to an instruction from the distributing user when the screen is motionless during distribution. In the embodiment of the present disclosure, however, the cover picture refers not only to a still image, but also to a video and audio.

With this configuration, it is possible to provide a technical improvement that can solve or relieve at least part of the challenge in the related art described above. Specifically, the present disclosure can provide a technique that prevents a loss of willingness of the viewing user to engage in viewing.

Generally, the viewing user interacts with the distributing user through actions, such as providing comments or gifts when viewing the video of the distributing user. Receiving no response from the distributing user to these actions is a sad experience for the viewing user. As a result, the viewing user may stop viewing or may lose willingness to engage in viewing. This is disadvantageous to the distributing user as well.

The situation where no response is received from the distributing user may typically occur when, for example, the distributing user does not see the screen. Even in such a case, however, the character object basically keeps appearing in the video. Therefore, it is difficult for the viewing user to know whether the distributing user has noticed the actions.

To indicate that the distributing user cannot or will not respond to actions, the distributing user may explain the own situation by using a drawing game (involving displaying text and illustrations entered by hand), which is a game that can be displayed in the video. It is undeniable, however, that preparing and displaying such an explanation is troublesome.

The embodiment of the present disclosure makes it possible to tell the viewing user, with a simple method, that the distributing user cannot or will not respond. This is advantageous in that the viewing user does not needlessly expect responses from the distributing user, and does not lose willingness to engage in viewing.

To inform the viewing user of the own situation, the distributing user used to go to the trouble of starting a game, such as a drawing game capable of displaying messages, and entering a message by hand. The embodiment of the present disclosure allows the distributing user to seamlessly display a screen showing the own situation, and provides improved usability to the distributing user.

Unlike in the case of simply displaying, over a video, a still image prepared by the distributing user to put a lid on the video, the configuration according to the embodiment of the present disclosure makes it possible to display, as a cover picture, a screen including a character related to the character object appearing in the video. This does not damage the atmosphere of the video even when the distributing user is absent. When coming back and starting the normal distribution, the distributing user can continue to distribute the video without getting a feeling of strangeness.

Rendering a 3D character object causes heavy processing load. Continuing the rendering even during absence of the distributing user is waste of machine resources and communication traffic. The embodiment of the present disclosure makes it possible to reduce processing load, because when movement of the distributing user is not applied to the character object (e.g., when the distributing user is absent), a still image or GIF animation is displayed on the screen.

Examples of the aforementioned embodiment will now be described. A description of other embodiments will also be given.

As described above, the predetermined presentation effect is to display, in association with the character object in a motionless state, an object for showing the viewing user that the character object is not behaving on the basis of movement of the distributing user.

Examples of such an object include, but are not particularly limited to, the soul object OB1 and the placard object OB2 illustrated in FIG. 20 to FIG. 22. Any object may be used here, as long as it can show the viewing user that the character object is not behaving on the basis of movement of the distributing user.

As described above, the character image included in the presentation screen may be a two-dimensional version of the character object, or a smaller-sized version of the character object, and the character image does not behave on the basis of movement of the distributing user.

Examples of such a character image include a two-dimensional version of the character object and a smaller-sized version of the character object, but are not limited to them. Any character image may be used, as long as it can be recognized by the viewing user as being different from the character object that reflects the movement of the distributing user.

Figures 24, 25:
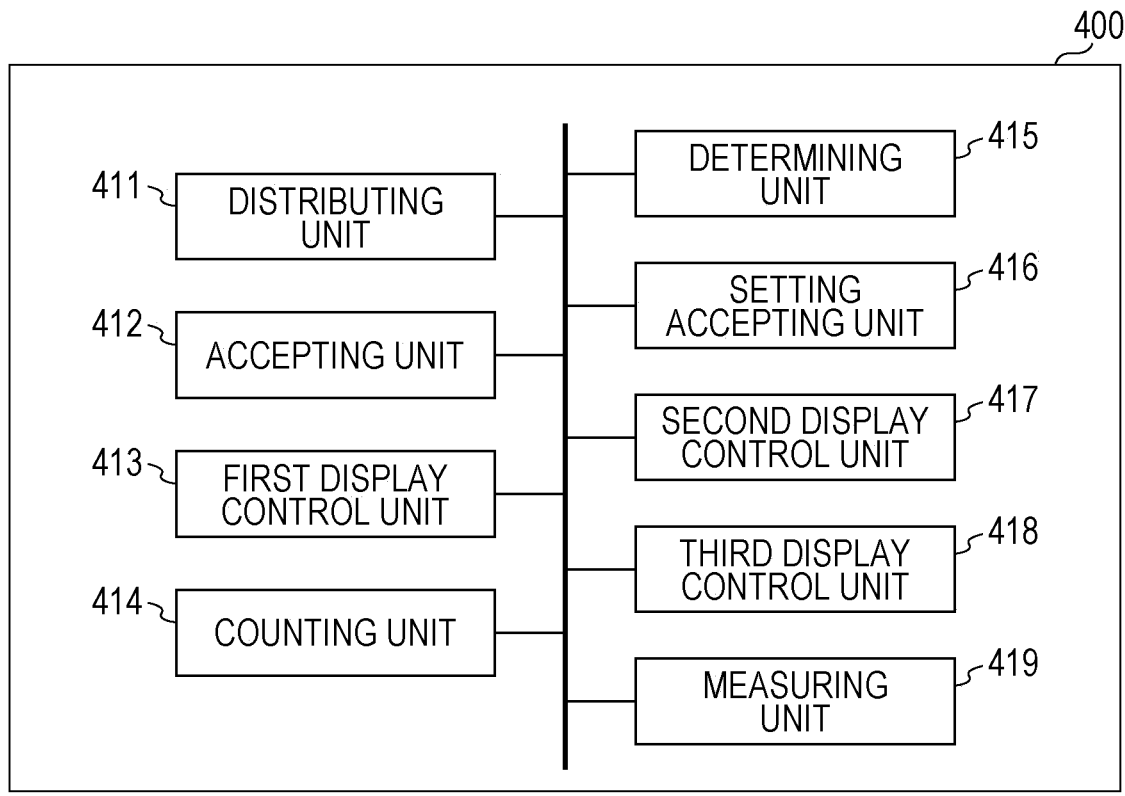
FIG. 24 illustrates another functional configuration of the server apparatus according to the embodiment of the present disclosure.
FIG. 25 illustrates a data configuration of data used in a determining unit according to an embodiment of the present disclosure.

One or more computer processors included in the information processing system 3000 according to the embodiment of the present disclosure can further include a counting unit 414 and a determining unit 415, as illustrated in FIG. 24.

The counting unit 414 counts the actions of the viewing user terminal 200 on the video.

Specifically, the counting unit 414 counts the actions of the viewing user terminal 200 on the video and provides the result as outcome information.

The actions of the viewing user on the video during video distribution may be, for example, gift display requests, comment posts, and/or, evaluation posts.

A gift display request is made, as described above, by selecting the gift button and specifying one of gifts on a list displayed by selecting the gift button. As outcome information, the counting unit 420 can count the number of gift display requests, or can count points corresponding to the quality (or price) of gifts for which the display requests have been made.

A comment is posted, as described above, by entering text in the comment post field and selecting the send button. As outcome information, the counting unit 420 can count the number of comments, or can count points corresponding to the quality (e.g., contents or the number of characters) of comments.

A positive (or good) evaluation can be posted by pressing the "Like" button, as described above. As outcome information, the counting unit 420 can count the number of evaluation posts, or can count points corresponding to the quality of evaluation posts.

As for the points corresponding to the quality of evaluation posts, for example, 1 point is assigned to each positive (or good) evaluation and −1 point is assigned to each negative (or bad) evaluation.

The outcome information simply needs to include information about at least one type of action, but may include information about a plurality of actions. In the present embodiment, such outcome information is used to determine posing data or motion data described below. Although an example of using the number of evaluation posts as the outcome information will be described, the outcome information is not limited to this.

On the basis of the result of counting performed by the counting unit 414, the determining unit 415 determines posing data or motion data to be applied to a character object having a predetermined presentation effect applied thereto, or to a character image.

The posing data and motion data (hereinafter referred to as "specific behavior") to be applied to the character object or character image are stored in advance in a predetermined storage device that is included in, or can be connected to, the information processing system according to the embodiment of the present disclosure.

As a specific behavior to be applied to the character object or character image, the determining unit 430 can determine a behavior associated with a section to which the outcome information provided by the counting unit 420 belongs.

As described above, information about the actions of the viewing user on the video is, for example, the number of evaluation posts. Behaviors are associated with respective sections, each corresponding to a predetermined range of the number of evaluation posts.

FIG. 25 illustrates a data configuration that associates the number of evaluation posts (the number of "likes") with behaviors, each associated with a corresponding section. A behavior associated with the same section may vary depending on the avatar type (e.g., sex or tribe).

The predetermined range, described above, may be defined by absolute values, or may be defined by relative values, such as "top XX %".

A behavior based on the posing data or motion data determined by the determining unit 415 is applied to a character object having a predetermined presentation effect applied thereto, or to a character image.

In the case of using posing data, the character object or character image is displayed as a still image, whereas in the case of using motion data, the character object or character image is displayed as a video. For example, the video can be implemented by GIF animation.

With the configuration described above, a character object having a predetermined presentation effect applied thereto or a character image can be made lively. Since the posing or motion is changed by the action of the viewing user on the video, the pleasure of seeing the cover picture can also be given to the viewing user.

The counting, determination, and application of posing or motion data described above may be executed during display of the cover picture. The posing or motion of the character object having a predetermined presentation effect applied thereto, or of the character image, may be changed in real time during display of the cover picture.

One or more computer processors included in the information processing system 3000 according to the embodiment of the present disclosure can further include a setting accepting unit 416, as illustrated in FIG. 24.

The setting accepting unit 416 accepts at least a setting for the background of a presentation screen, a setting for a predetermined period of time, a setting for text displayed on the presentation screen, a setting for audio input during display control, or a setting for a character object having a predetermined presentation effect applied thereto or for a character image.

Figure 26:
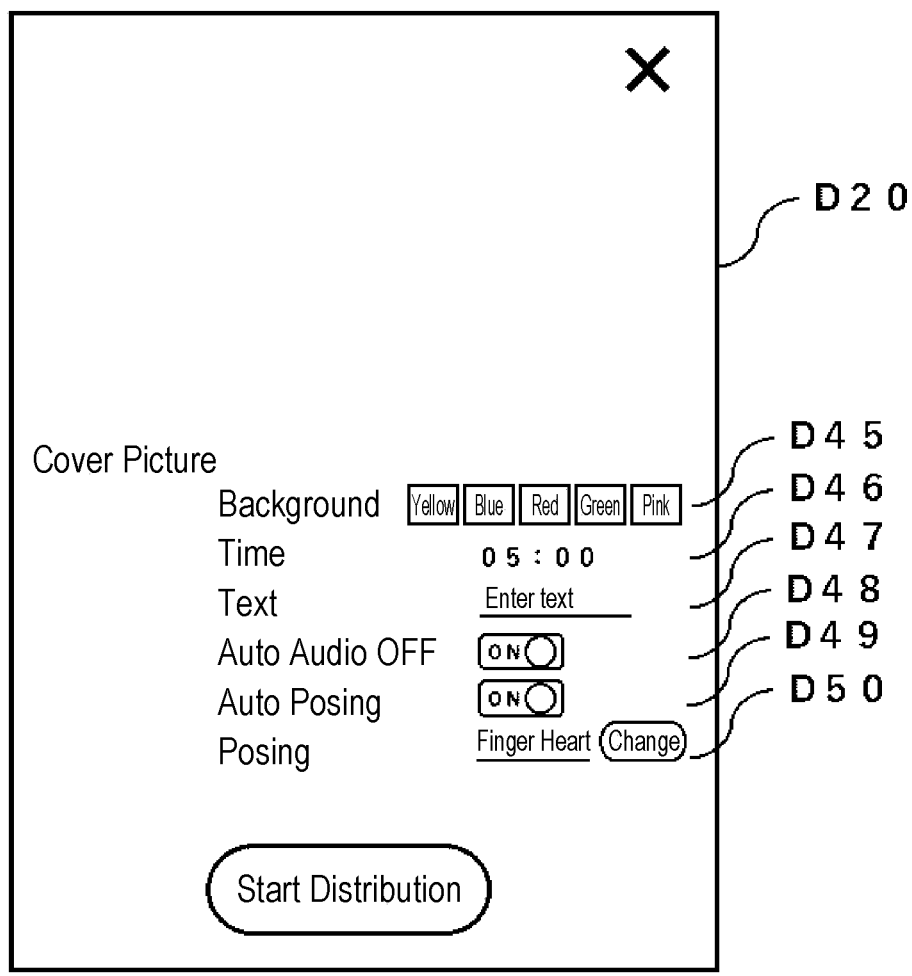
FIG. 26 illustrates an image of a screen displayed on a user terminal.

The distribution settings screen D20 illustrated in FIG. 26 displays setting fields D45 to D50 for display control. For simplicity, FIG. 26 does not show various setting fields illustrated in FIG. 7.

The setting field D45 is a field for making a setting for the background of the presentation screen. The setting field D45 allows the user to select one of a plurality of backgrounds presented. In the example illustrated in FIG. 26, the user can select one of a plurality of colors (yellow, blue, red, green, and pink) presented.

The setting field D46 is a field for making a setting for a predetermined period of time. The setting field D46 allows the user to set a predetermined period of time in units of minutes and seconds. The lower and upper limits of the predetermined period of time may be set in advance.

The setting field D47 is a field for making a setting for text to be displayed on the presentation screen. The setting field D47 allows the user to freely set text to be displayed in the first display field E12 illustrated in FIG. 23. The text to be displayed in the second display field E13 may also be freely set in the setting field D47, or may be automatically drawn from the profile field of the distributing user.

The text for the first display field E12 may be set by selecting a template prepared in advance, or may be set by filling in blank spaces in a template. Examples of the template prepared include "Please wait for a while" and "I will be back soon!". The text may include information about when to return to normal distribution, such as "I will be back in XX minutes" or "I will be back at XX:XX".

The setting field D48 is a field for making a setting for audio input during display control. When "Auto Audio OFF" is set to ON, the microphone can be automatically turned off during display control.

The setting field D49 is a field for making a setting for a character object having a predetermined presentation effect applied thereto, or for a character image. When automatic posing (or automatic motion) is set to ON, the posing or motion determined by the determining unit 415 is applied, as described above. On the other hand, when automatic posing (or automatic motion) is set to OFF, the user can select desired posing or motion in the setting field D50. Specifically, selecting a Change button develops a posing selection screen.

The settings described above may be made on the distribution settings screen D20 at the stage of preparing the distribution, or may be made on a setting change screen developed by selecting the setting button D41 during distribution. Once settings are made, they are migrated to the next distribution.

The settings described above may be made on a profile screen displayed by selecting the profile button T24 on the top screen T10 illustrated in FIG. 5. When the settings described above are made on the profile screen, the settings are reflected as settings for all videos distributed by the distributing user.

By making the settings as described above, the distributing user can add originality to the cover picture, and thus can entertain the viewing user more.

As described above, the setting accepting unit 416 can accept settings during video distribution. In this case, as a character image to be displayed on the presentation screen, the setting accepting unit 416 can set a still image of a character object shot by a distributing user's operation during video distribution.

Figure 27:
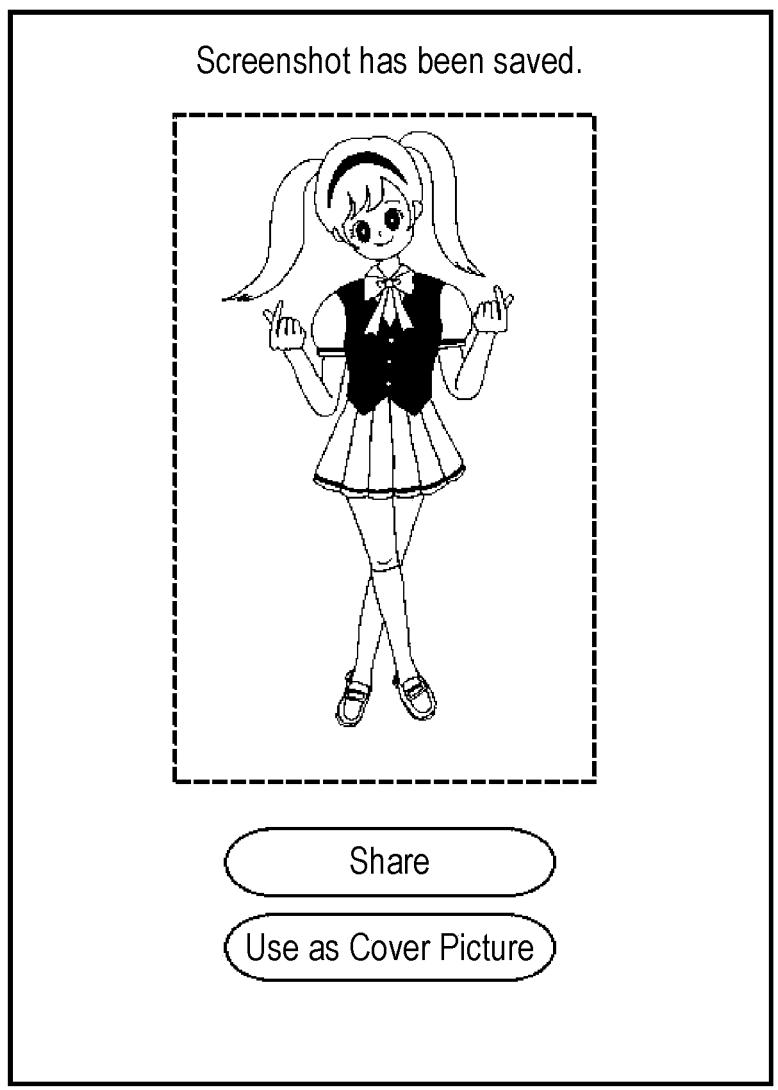
FIG. 27 illustrates another image of a screen displayed on a user terminal.

Such a still image can be shot by selecting the photo button D32 on the avatar distribution screen D30. FIG. 27 illustrates an image of a screen displayed when a still image is shot by selecting the photo button D32. The screen allows selection of whether the still image is to be shared, or to be used as a cover picture. Such a still image may be shot on the profile setting screen before video distribution.

As described above, as a cover picture to be displayed on the presentation screen, the setting accepting unit 416 can set a video (and/or user's voice) of the character object captured by the distributing user's operation during distribution.

As described above, the first operation information can be, for example, information that is transmitted from the distributing user terminal 100 in response to the distributing user's operation on the first operation object displayed on the screen of the distributing user terminal 100. Also, as described above, the second operation information can be information from the distributing user terminal 100, such as audio information and/or motion information for moving the character object.

When the distributing user is performing audio-only radio distribution, only audio information is transmitted from the distributing user terminal 100 as the second operation information.

The first display control unit 413 can terminate the display control in response to accepting third operation information from the distributing user terminal 100, or in response to accepting, by the accepting unit 412, the second operation information from the distributing user terminal 100.

The third operation information is operation information for terminating the display control.

The third operation information is, for example, information that is transmitted from the distributing user terminal 100 in response to the distributing user's operation on a second operation object displayed on the screen of the distributing user terminal 100.

The user's operation on the second operation object is, for example, a selecting operation of selecting a cover release button D54, such as that illustrated in FIG. 22. Examples of the selecting operation include, but are not limited to, tapping or double-tapping on the screen. The selecting operation may be performed by voice or eye movement.

The accepting unit 412 can further accept a display request to display gifts from the viewing user terminal 200.

In this case, one or more computer processors included in the information processing system 3000 according to the embodiment of the present disclosure can further include a second display control unit 417, as illustrated in FIG. 24.

The second display control unit 417 controls display of gift objects corresponding to the gifts in the video.

For a display request accepted by the accepting unit 412 during display control by the first display control unit 413, the second display control unit 417 does not display the gift objects during display control by the first display control unit 413. After termination of the display control by the first display control unit 413, the second display control unit 417 can display the gift objects corresponding to the display request in a predetermined order.

For example, after termination of display control by the first display control unit 413, the second display control unit 417 displays a plurality of types of gift objects together on the screen. The upper limit of the number of gift objects to be displayed together is defined for each gift type. Gift objects exceeding the upper limit for the gift type are displayed on the screen after the previous display of gift objects of the same gift type.

With this configuration, the distributing user can have a good experience of receiving lots of gifts by releasing the display control performed by the first display control unit 413. This creates strong motivation for releasing the display control by the first display control unit 413 (i.e., returning to normal distribution), and also gives an advantage of facilitating responses to gifts when the distributing user returns to normal distribution.

By displaying gifts when the distributing user will definitely be viewing the screen, rather than displaying them when the distributing user is not viewing the screen, it is possible to achieve more effective use of machine resources.

The accepting unit 412 can also accept a display request to display comments from the viewing user terminal 200.

In this case, one or more computer processors included in the information processing system 3000 according to the embodiment of the present disclosure may further include a third display control unit 418, as illustrated in FIG. 24.

The third display control unit 418 controls display of the comments in the video.

For a display request accepted by the accepting unit 412 during display control by the first display control unit 413, the third display control unit 418 performs display during the display control by the first display control unit 413. The third display control unit 418 can display comments at least on the screen of the distributing user terminal 100 in such a way that the comments can be identified as corresponding to the display request accepted during the display control by the first display control unit 413.

For example, comments corresponding to the display request are displayed in a comment display field. The latest comment is displayed at the lower level and moved a level higher when the next comment appears. The comment is not displayed after being moved to the upper level in the comment display field, but can be checked back by user's scrolling.

When the distributing user who has not been checking the screen of the distributing user terminal 100 returns to the front of the screen and checks comments back, the distributing user may not be able to identify unread comments (to which the distributing user has yet to respond). To avoid such a situation, comments corresponding to the display request accepted during display control by the first display control unit 413 are displayed on the screen in such a way as to be identified as unread comments.

Figure 28:
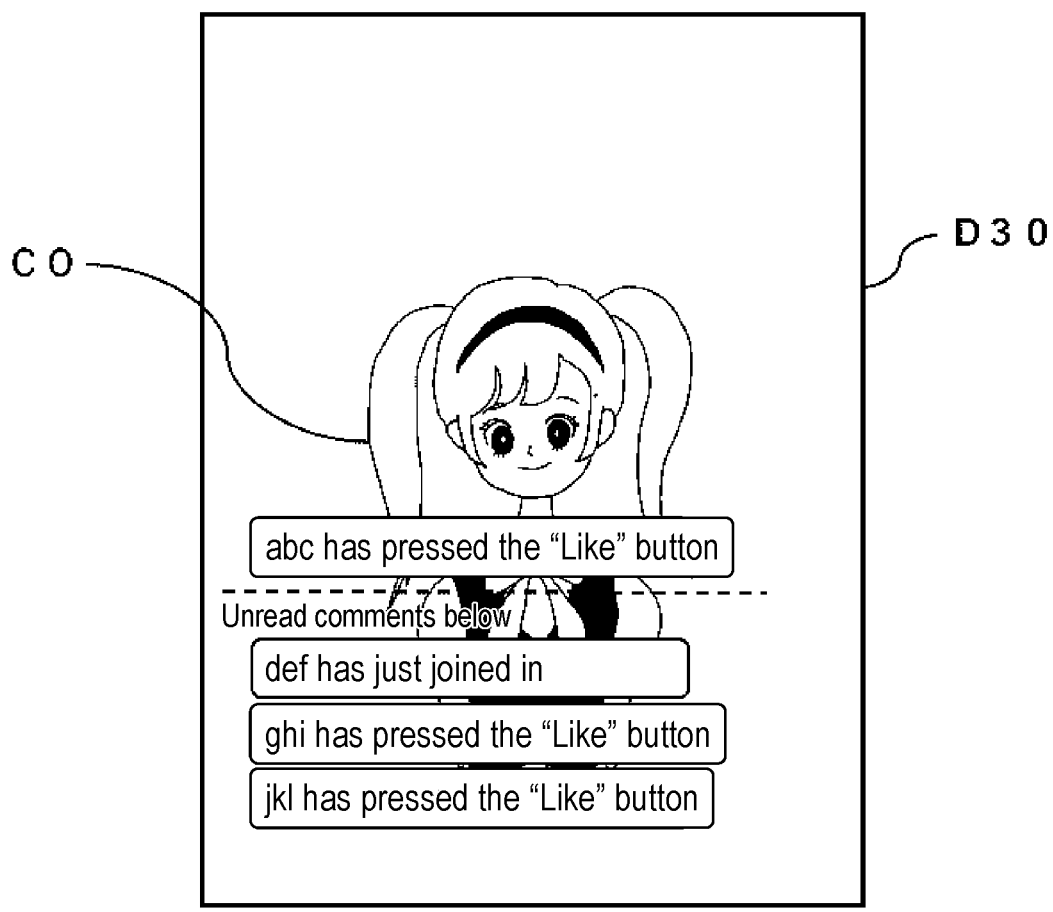
FIG. 28 illustrates another image of a screen displayed on a user terminal.

For example, as illustrated in FIG. 28, a line is placed between comments appearing before and after the start of display control by the first display control unit 413 and a text message, such as "Unread comments below", is displayed, so that the distributing user can identify unread comments.

By thus facilitating the checking of unread comments, the usability for the distributing user is improved.

The unread comments may be made identifiable by varying the color or thickness of the frames for comments. The comments may include not only those posted by viewing users, but also include system comments describing the actions of viewing users (such as "XX has just joined in" and "XX has pressed the "Like" button").

The display of, for example, the line for indicating the unread comments may be terminated upon completion of checking by the distributing user (i.e., after the unread comments are displayed back on the screen).

The display for identification of unread comments, described above, does not appear on the viewing user terminal 200.

One or more computer processors included in the information processing system 3000 according to the embodiment of the present disclosure can further include a measuring unit 419, as illustrated in FIG. 24.

The measuring unit 419 measures the time elapsed from when the first display control unit 413 started the display control.

The first display control unit 413 displays the elapsed time in the video subjected to the display control.

Figure 29:
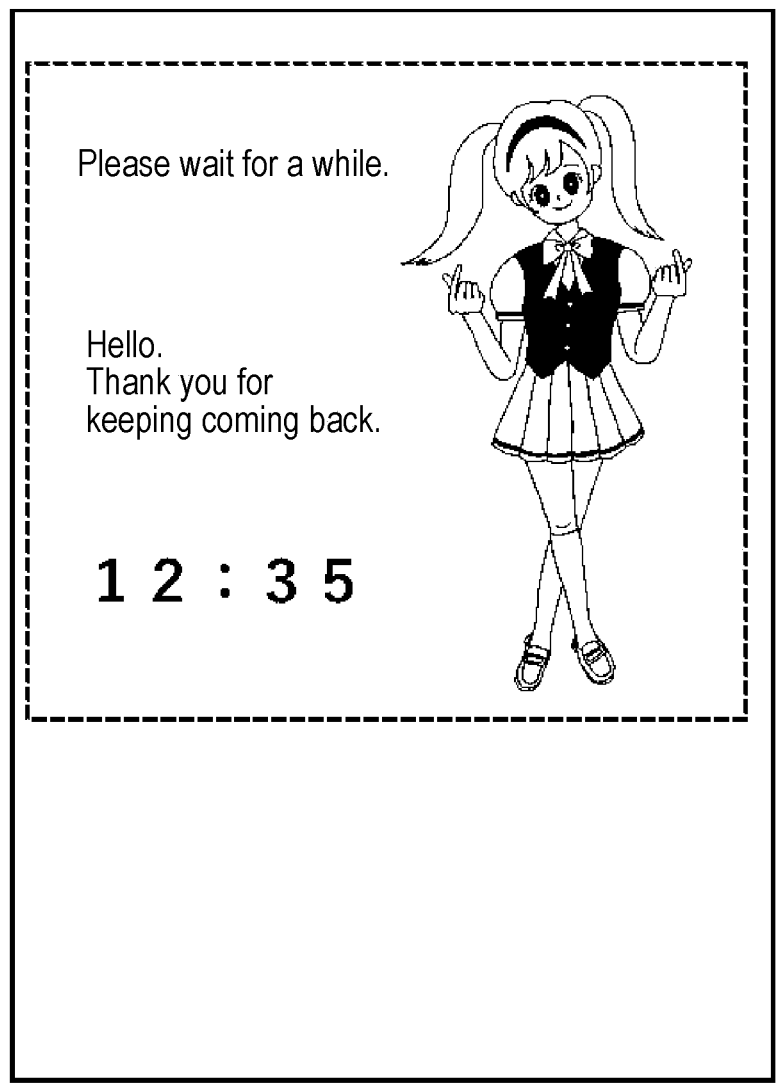
FIG. 29 illustrates another image of a screen displayed on a user terminal.

FIG. 29 illustrates an image of a screen displaying the elapsed time. Displaying the elapsed time can clearly show the viewing user the period of time during which the distributing user has been absent.

Instead of the elapsed time, a countdown to the end of the display control by the first display control unit 413 may be displayed. In this case, the period of time to be elapsed before the end of the display control by the first display control unit 413 can be set by the distributing user.

The posing or motion of the character image may be changed as the time elapses. This makes it possible, for example, to express the way in which the character is falling or getting up as the time elapses. This character image can be displayed together with the elapsed time or countdown described above. For example, the first display control unit 413 can display the way in which the character is falling as the time elapses, or the character is getting up as the countdown proceeds.

If the video includes the character object of another (or second) user (i.e., in the case of collaboration described above), the first display control unit 413 can perform display control in response to accepting the first operation information from the distributing user terminal 100 or from a user terminal of the second user, or in response to not accepting, by the accepting unit 412, the second operation information from the distributing user terminal 100 and the user terminal of the second user for a predetermined period of time.

In this case, as display control, the first display control unit 413 applies a predetermined presentation effect to a specific character object included in the video, or displays a presentation screen that includes predetermined character images related to all character objects.

In the case of applying a predetermined presentation effect to a character object, the character object to which the predetermined presentation effect is to be applied is the character object of a user related to a user terminal from which the first operation information has been transmitted, or the character object of a user related to a user terminal from which the second operation information has not been transmitted for a predetermined period of time. Here, the user terminal refers not only to the user terminal of a host user, but also to the user terminal of a guest user.

In the case of displaying a presentation screen including a predetermined character image, a lid is put on the entire video. Therefore, the first operation information can be transmitted from the user terminal of only a host user. Similarly, the first display control unit 413 displays the presentation screen in response to not accepting the second operation information from the user terminal of a host user for a predetermined period of time.

Accordingly, the embodiment of the present disclosure can provide a technical improvement that solves or relieves at least part of the challenge in the related art described above. Specifically, the embodiment of the present disclosure can provide a technique that prevents a loss of willingness of the viewing user to engage in viewing.

For example, when the second operation information from the distributing user terminal 100 cannot be received, the character object can be prevented from continuing to be displayed in a motionless state. In this case, the viewing user cannot see the situation of the distributing user. Such an undesirable viewing experience may cause the viewing user to stop engaging in viewing.

By displaying the cover picture at an appropriate time, the distributing user can tell the viewing user the own situation, so that the viewing user can understand the situation. Thus, the distributing user can tell the viewing user the situation of being unable to respond. This can reduce bad experiences caused by misunderstandings, such as being ignored or getting no response to the comment.

By clarifying the situation of the distributing user at the beginning of viewing, it is possible to expect an increase in the average maximum number of concurrent viewers and the average viewing time.

An information processing method according to an embodiment of the present disclosure will now be described.

The information processing method according to the embodiment of the present disclosure is an information processing method carried out in the information processing system 3000 illustrated in FIG. 3. The information processing system 3000 includes at least one distributing user terminal 100, viewing user terminal 200, and server apparatus 400.

Figure 30:
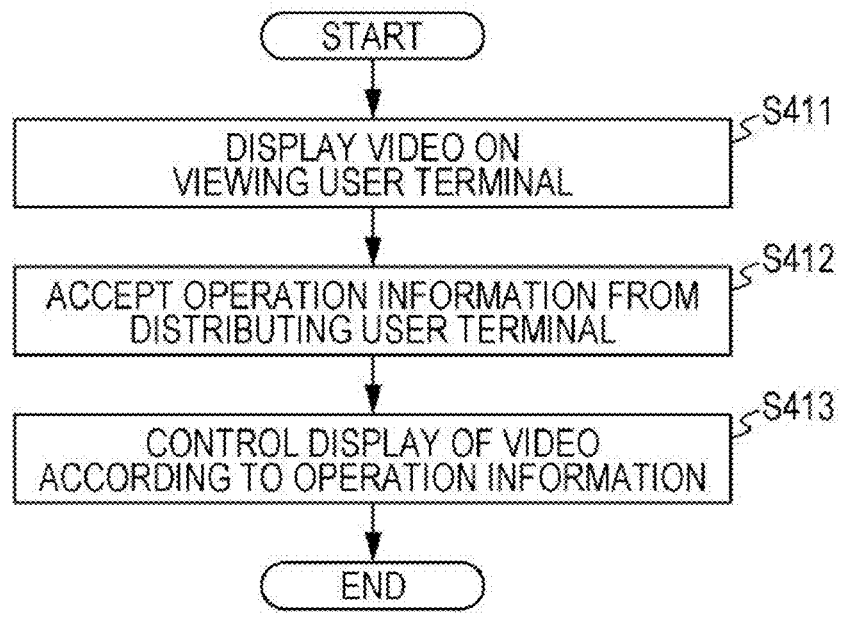
FIG. 30 illustrates a flowchart of a flow of an information processing method according to an embodiment of the present disclosure.

As illustrated as an example in FIG. 30, the information processing method according to the embodiment of the present disclosure causes one or more computer processors included in the information processing system 3000 to execute a distributing step S411, an accepting step S412, and a first display control step S413.

The distributing step S411 transmits, to the viewing user terminal 200, information about a video including the character object of the distributing user to display the video on the viewing user terminal 200. The distributing step S411 can be executed by the distributing unit 411 described above.

The accepting step S412 accepts operation information from the distributing user terminal 100. The accepting step S412 can be executed by the accepting unit 412 described above.

Specifically, the accepting step S412 determines whether the first operation information from the distributing user terminal 100 has been accepted. Alternatively, the accepting step S412 determines whether the second operation information from the distributing user terminal 100 has been accepting for a predetermined period of time.

The first display control step S413 controls display of the video (or performs display control on the video) in accordance with the operation information accepted in the accepting step S412. The first display control step S413 can be executed by the first display control unit 413 described above.

Specifically, as the display control, the first display control step S413 applies a predetermined presentation effect to a character object included in the video, or displays a presentation screen including a predetermined character image related to the character object.

With the configuration described above, a technical improvement that solves or relieves at least part of the challenge in the related art can be provided. Specifically, the embodiment of the present disclosure can provide a technique that prevents a loss of willingness of the viewing user to engage in viewing.

Next, a computer program according to an embodiment of the present disclosure will be described.

The computer program according to the embodiment of the present disclosure is a computer program executed in the information processing system 3000 that distributes a video, as illustrated in FIG. 3. The information processing system 3000 includes at least one distributing user terminal 100, viewing user terminal 200, and server apparatus 400.

The computer program according to the embodiment of the present disclosure causes one or more computer processors included in the information processing system 3000 to implement a distributing function, an accepting function, and a first display control function.

The distributing function transmits, to the viewing user terminal 200, information about a video including a character object that behaves on the basis of movement of the distributing user to display the video on the viewing user terminal 200.

The accepting function accepts operation information from the distributing user terminal 100.

The first display control function controls display of the video (or performs display control on the video) in accordance with the operation information accepted by the accepting function.

As display control, the first display control function applies a predetermined presentation effect to a character object included in the video, or displays a presentation screen including a predetermined character image related to the character object.

The first display control function performs display control in response to accepting first operation information from the distributing user terminal 100, or in response to not accepting, by the accepting function, second operation information from the distributing user terminal 100 for a predetermined period of time.

Figure 31:
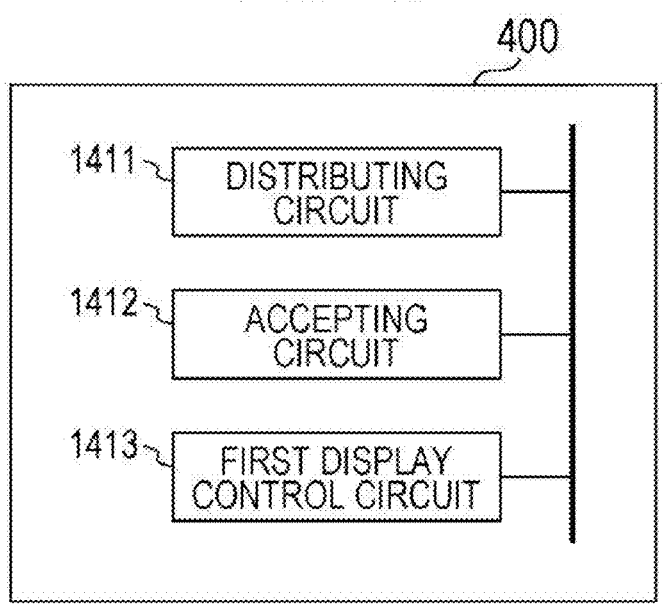
FIG. 31 illustrates an example of a circuit configuration according to an embodiment of the present disclosure.

The functions described above can be implemented by a distributing circuit 1411, an accepting circuit 1412, and a first display control circuit 1413 of server apparatus 400 as illustrated in FIG. 31. The distributing circuit 1411, the accepting circuit 1412, and the first display control circuit 1413 are implemented by the distributing unit 411, the accepting unit 412, and the first display control unit 413, respectively. The details of each unit are as described above.

With the configuration described above, a technical improvement that solves or relieves at least part of the challenge in the related art can be provided. Specifically, the embodiment of the present disclosure can provide a technique that prevents a loss of willingness of the viewing user to engage in viewing.

An information processing apparatus according to an embodiment of the present disclosure will now be described. The information processing apparatus corresponds to the distributing user terminal 100 in the information processing system 3000.

Figure 32:
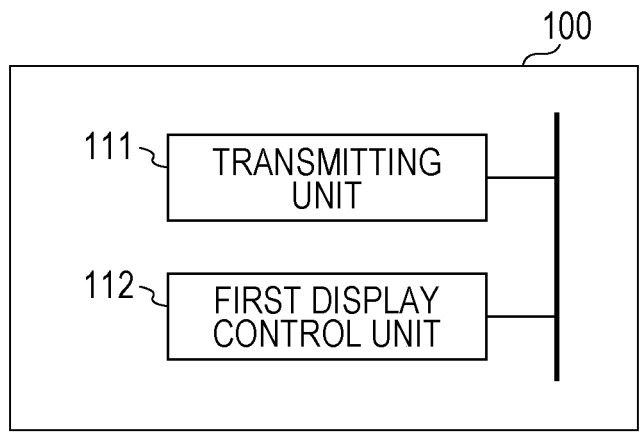
FIG. 32 illustrates an example of a functional configuration of a distributing user terminal according to an embodiment of the present disclosure.

As illustrated in FIG. 32, the information processing apparatus includes a transmitting circuit 111 and a first display control unit 112.

The transmitting circuit 111 transmits, to the server apparatus 400, information about a video including a character object that behaves on the basis of movement of the distributing user and information about a distributing user's operation.

The first display control unit 112 controls display of the video (or performs display control on the video) in accordance with the distributing user's operation.

Then, as display control, the first display control unit 112 applies a predetermined presentation effect to a character object included in the video, or displays a presentation screen including a predetermined character image related to the character object.

The first display control unit 112 performs display control in response to a first operation by the distributing user, or in response to not accepting a second operation by the distributing user for a predetermined period of time.

The first display control unit 112 has the same configuration as the first display control unit 413 described above.

With the configuration described above, a technical improvement that solves or relieves at least part of the challenge in the related art can be provided. Specifically, the embodiment of the present disclosure can provide a technique that prevents a loss of willingness of the viewing user to engage in viewing.

Next, an example of the information processing method according to the embodiment of the present disclosure will be described. This information processing method is an information processing method executed in the information processing apparatus (distributing user terminal 100) described above.

Figure 33:
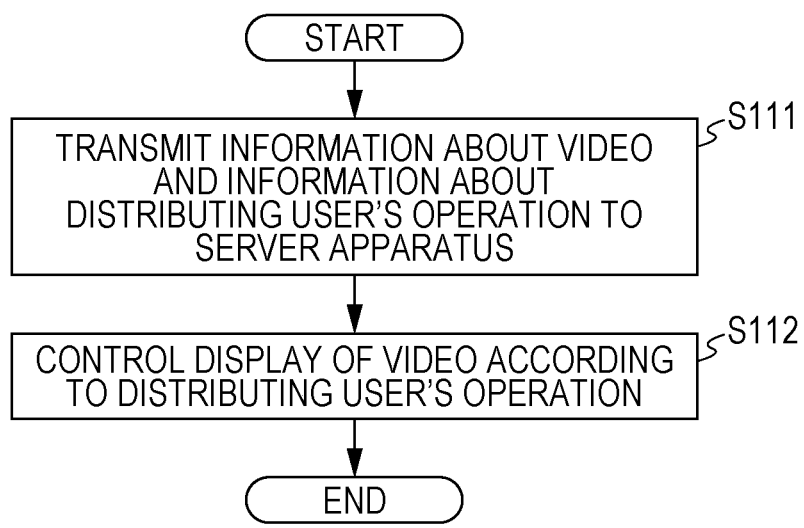
FIG. 33 illustrates a flowchart of a flow of an information processing method performed in a distributing user terminal according to an embodiment of the present disclosure.

As illustrated as an example in FIG. 33, the information processing method according to the embodiment of the present disclosure causes one or more computer processors included in the information processing apparatus to execute a transmitting step S111 and a first display control step S112.

The transmitting step S111 transmits, to the server apparatus 400, information about a video including a character object that behaves on the basis of movement of the distributing user and information about a distributing user's operation. The transmitting step S111 can be executed by the transmitting circuit 111 described above.

The first display control step S112 controls display of the video (or performs display control on the video) in accordance with the distributing user's operation.

As the display control, the first display control step S112 applies a predetermined presentation effect to the character object included in the video, or displays a presentation screen including a predetermined character image related to the character object.

The first display control step S112 performs display control in response to a first operation by the distributing user, or in response to not accepting a second operation by the distributing user for a predetermined period of time.

The first display control step S112 can be executed by the first display control unit 112 described above.

With the configuration described above, a technical improvement that solves or relieves at least part of the challenge in the related art can be provided. Specifically, the embodiment of the present disclosure can provide a technique that prevents a loss of willingness of the viewing user to engage in viewing.

Next, a computer program according to an embodiment of the present disclosure will be described. This computer program is a computer program executed in the information processing apparatus (distributing user terminal 100) described above.

The computer program according to the embodiment of the present disclosure causes one or more computer processors included in the information processing apparatus to implement a transmitting function and a first display control function.

The transmitting function transmits, to the server apparatus 400, information about a video including a character object that behaves on the basis of movement of the distributing user and information about a distributing user's operation.

The first display control function controls display of the video (or performs display control on the video) in accordance with the distributing user's operation.

As the display control, the first display control function applies a predetermined presentation effect to the character object included in the video, or displays a presentation screen including a predetermined character image related to the character object.

The first display control function performs display control in response to a first operation by the distributing user, or in response to not accepting a second operation by the distributing user for a predetermined period of time.

Figure 34:
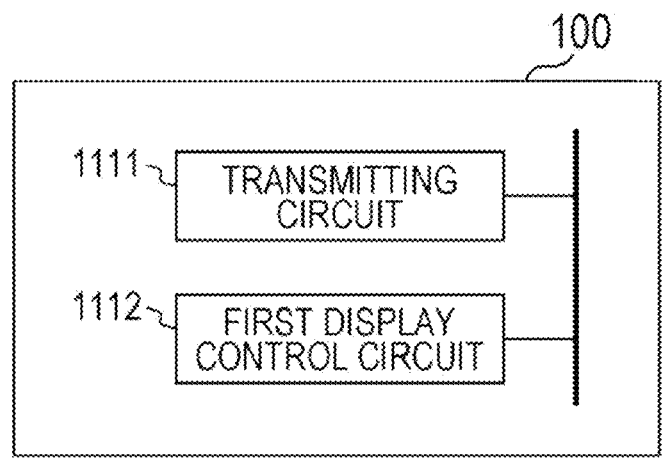
FIG. 34 illustrates an example of a circuit configuration according to an embodiment of the present disclosure.

The functions described above can be implemented by a transmitting circuit 1111 and a first display control circuit 1112 of distributing user terminal 100 as illustrated in FIG. 34. The transmitting circuit 1111 and the first display control circuit 1112 are implemented by the transmitting circuit 111 and the first display control unit 112, respectively. The details of each unit are as described above.

With the configuration described above, a technical improvement that solves or relieves at least part of the challenge in the related art can be provided. Specifically, the embodiment of the present disclosure can provide a technique that prevents a loss of willingness of the viewing user to engage in viewing.

An information processing apparatus according to an embodiment of the present disclosure will now be described. The information processing apparatus corresponds to the viewing user terminal 200 in the information processing system 3000 described above.

Figure 35:
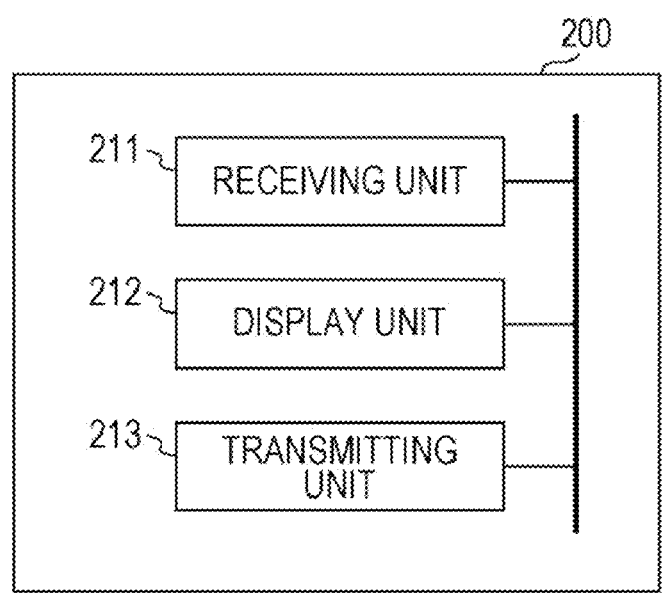
FIG. 35 illustrates an example of a functional configuration of a viewing user terminal according to an embodiment of the present disclosure.

As illustrated in FIG. 35, the information processing apparatus includes a receiving unit 211, a display unit 212, and a transmitting unit 213.

The receiving unit 211 receives, from the server apparatus 400, information about a video including a character object that behaves on the basis of movement of the distributing user.

The display unit 212 displays the video on the basis of the information received by the receiving unit 211.

The transmitting unit 213 transmits a gift and/or comment display request to the server apparatus 400 in response to a viewing user's operation.

The display unit 212 displays a video which is subjected to display control in accordance with operation information from the distributing user terminal 100.

The display control involves applying a predetermined presentation effect to a character object included in the video, or displaying a presentation screen including a predetermined character image related to the character object.

With the configuration described above, a technical improvement that solves or relieves at least part of the challenge in the related art can be provided. Specifically, the embodiment of the present disclosure can provide a technique that prevents a loss of willingness of the viewing user to engage in viewing.

Next, an example of the information processing method according to the embodiment of the present disclosure will be described. This information processing method is an information processing method executed in the information processing apparatus (viewing user terminal 200) described above.

Figure 36:
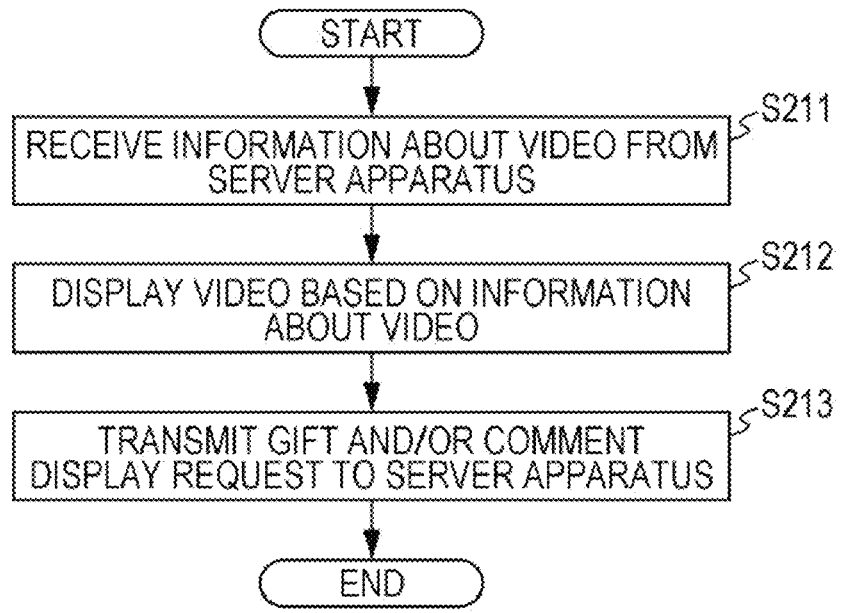
FIG. 36 illustrates a flowchart of a flow of an information processing method performed in a viewing user terminal according to an embodiment of the present disclosure.

As illustrated as an example in FIG. 36, the information processing method according to the embodiment of the present disclosure causes one or more computer processors included in the information processing apparatus to execute a receiving step S211, a display step S212, and a transmitting step S213.

The receiving step S211 receives, from the server apparatus 400, information about a video including a character object that behaves on the basis of movement of the distributing user. The receiving step S211 can be executed by the receiving unit 211 described above.

The display step S212 displays the video on the basis of the information received in the receiving step S211. The display step S212 can be executed by the display unit 212 described above.

The transmitting step S213 transmits a gift and/or comment display request to the server apparatus 400 in response to a viewing user's operation. The transmitting step S213 can be executed by the transmitting unit 213 described above.

The display step S212 displays a video which is subjected to display control in accordance with operation information from the distributing user terminal 100.

The display control involves applying a predetermined presentation effect to a character object included in the video, or displaying a presentation screen including a predetermined character image related to the character object.

With the configuration described above, a technical improvement that solves or relieves at least part of the challenge in the related art can be provided. Specifically, the embodiment of the present disclosure can provide a technique that prevents a loss of willingness of the viewing user to engage in viewing.

A computer program according to an embodiment of the present disclosure will be described. This computer program is a computer program executed in the information processing apparatus (viewing user terminal 200) described above.

The computer program according to the embodiment of the present disclosure causes one or more computer processors included in the information processing apparatus to implement a receiving function, a display function, and a transmitting function.

The receiving function receives, from the server apparatus 400, information about a video including a character object that behaves on the basis of movement of the distributing user.

The display function displays a video on the basis of the information received by the receiving function.

The transmitting function transmits a gift and/or comment display request to the server apparatus 400 in response to a viewing user's operation.

The display function displays a video which is subjected to display control in accordance with operation information from the distributing user terminal 100.

The display control involves applying a predetermined presentation effect to a character object included in the video, or displaying a presentation screen including a predetermined character image related to the character object.

Figure 37:
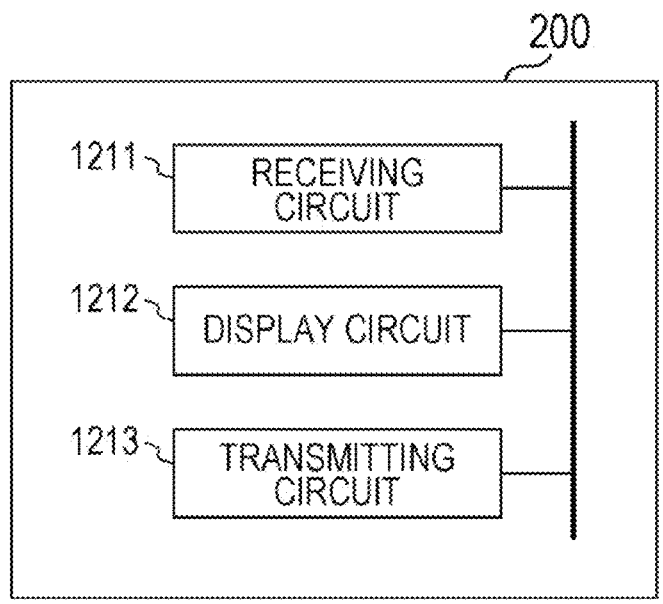
FIG. 37 illustrates an example of a circuit configuration according to an embodiment of the present disclosure.

The functions described above can be implemented by a receiving circuit 1211, a display circuit 1212, and a transmitting circuit 1213 of viewing user terminal 200 as illustrated in FIG. 37. The receiving circuit 1211, the display circuit 1212, and the transmitting circuit 1213 are implemented by the receiving unit 211, the display unit 212, and the transmitting unit 213, respectively. The details of each unit are as described above.

With the configuration described above, a technical improvement that solves or relieves at least part of the challenge in the related art can be provided. Specifically, the embodiment of the present disclosure can provide a technique that prevents a loss of willingness of the viewing user to engage in viewing.

An information processing apparatus, such as a computer or a mobile phone, can suitably function as the server apparatus or the terminal device according to the embodiment described above. The information processing apparatus can be implemented by storing, in a storage unit of the information processing apparatus, a program that describes processing for implementing each function of the server apparatus or the terminal device according to the embodiment, and reading and executing the program by the CPU of the information processing apparatus.

The embodiments of the present disclosure described above are presented as examples, and are not intended to limit the scope of the disclosure. These novel embodiments can be carried out in various other ways and various omissions, replacements, and changes can be made thereto without departing from the gist of the disclosure. These embodiments and modifications thereof are included in the scope and gist of the disclosure, and are also included in the disclosure set forth in the appended claims and the scope of equivalents thereof.

The techniques described in the embodiments may be stored, as programs that can be executed by a calculator (computer), in a recording medium, such as a magnetic disk (e.g., floppy (registered trademark) disk, or hard disk), an optical disc (e.g., CD-ROM, DVD, or MO), or a semiconductor memory (e.g., ROM, RAM, or flash memory), or may be distributed by transmission through a communication medium. The programs stored in a medium include a setting program for installing, in the computer, software means (including tables and data structures, as well as execution programs) to be executed by the computer.

The computer that implements the present apparatus loads a program recoded in the recording medium, constructs the software means in accordance with the setting program where necessary, and causes the software means to control the operation to execute the processing described above. In the present specification, the term "recording medium" refers not only to that for distribution, but also refers to a storage medium, such as a magnetic disk or semiconductor memory, in the computer or in a device connected thereto through a network. The storage unit may function as, for example, a main storage, an auxiliary storage, or a cache memory.

What is claimed is:

1. An information processing system, comprising:
processing circuitry configured to:
    transmit, to a viewing user terminal, information about a video including a character object of a distributing user to display the video on the viewing user terminal,
    accept operation information from a distributing user terminal of the distributing user, and
    perform a display control process, on the video in accordance with the accepted operation information, by applying a predetermined presentation effect to the character object included in the video, or displaying a presentation screen including a predetermined character image related to the character object, wherein
the processing circuitry performs the display control process in response to accepting first operation information from the distributing user terminal, the first operation information having been transmitted from the distributing user terminal in response to an operation of the distributing user on a first operation object displayed on a screen of the distributing user terminal, and
the processing circuitry performs the display control process in response to not accepting second operation information from the distributing user terminal for a predetermined period of time, the second operation information including audio information and/or motion information from the distributing user terminal, and the motion information being for moving the character object.

2. The information processing system according to claim 1, wherein the processing circuitry applies the predetermined presentation effect by displaying, in association with the character object in a motionless state, an object for showing a viewing user that the character object is not behaving on a basis of movement of the distributing user.

3. The information processing system according to claim 1, wherein
    the character image included in the presentation screen is a two-dimensional version of the character object or a smaller-sized version of the character object, and
    the character image does not behave on a basis of movement of the distributing user.

4. The information processing system according to claim 1, wherein
    the processing circuitry is further configured to
        count actions of the viewing user terminal on the video, and
        determine posing data or motion data to be applied to the character object having the predetermined presentation effect applied thereto or to the character image, on a basis of the counted actions, and
    a behavior based on the posing data or the motion data is applied to the character object having the predetermined presentation effect applied thereto or to the character image.

5. The information processing system according to claim 1, wherein the processing circuitry is further configured to accept a setting made by the distributing user for the display control process, the setting being any of
    a setting for a background of the presentation screen,
    a setting for the predetermined period of time,
    a setting for text to be displayed on the presentation screen,
    a setting for audio input during the display control process, and
    a setting for the character object having the predetermined presentation effect applied thereto or for the character image.

6. The information processing system according to claim 5, wherein
    the processing circuitry accepts the setting during distribution of the video, and
    the processing circuitry sets a still image of the character object as the character image to be displayed on the presentation screen, the still image being shot by an operation of the distributing user during distribution of the video.

7. The information processing system according to claim 1, wherein the processing circuitry terminates the display control process in response to accepting third operation information from the distributing user terminal, or in response to accepting the second operation information from the distributing user terminal.

8. The information processing system according to claim 7, wherein the third operation information is transmitted from the distributing user terminal in response to an operation of the distributing user on a second operation object displayed on a screen of the distributing user terminal.

9. The information processing system according to claim 1, wherein the processing circuitry is further configured to
    accept a display request to display gifts from the viewing user terminal;
    control to display gift objects corresponding to the gifts in the video; and
    in a case that the display request is accepted during the display control process, control to not display the gift objects during the display control process, and control to display the gift objects corresponding to the display request in a predetermined order after termination of the display control process.

10. The information processing system according to claim 1, wherein the processing circuitry is further configured to
    accept a display request to display comments from the viewing user terminal;
    control to display the comments in the video; and
    in a case that the display request is accepted during the display control process, control to display the comments during the display control process such that the comments are identifiable as corresponding to the display request.

11. The information processing system according to claim 1, wherein the processing circuitry is further configured to
measure an elapsed time from when the display control process is started; and
display the elapsed time in the video subjected to the display control process.

12. The information processing system according to claim 1, wherein
in a case that the video includes a character object of a second user, the processing circuitry performs the display control process in response to accepting the first operation information from the distributing user terminal or a user terminal of the second user, and
in the case that the video includes the character object of the second character, the processing circuitry performs the display control process in response to not accepting the second operation information from the distributing user terminal and the user terminal of the second user for a predetermined period of time.

13. An information processing method, comprising:
transmitting, by processing circuitry of an information processing system to a viewing user terminal, information about a video including a character object of a distributing user to display the video on the viewing user terminal;
accepting operation information from a distributing user terminal of the distributing user; and
performing, by the processing circuitry on the video and in accordance with the accepted operation information, a display control process by applying a predetermined presentation effect to the character object included in the video, or displaying a presentation screen including a predetermined character image related to the character object, wherein
the performing the display control process is performed in response to accepting first operation information from the distributing user terminal, the first operation information having been transmitted from the distributing user terminal in response to an operation of the distributing user on a first operation object displayed on a screen of the distributing user terminal, and
the performing the display control process is performed in response to not accepting second operation information from the distributing user terminal for a predetermined period of time, the second operation information including audio information and/or motion information from the distributing user terminal, and the motion information being for moving the character object.

14. An information processing method, comprising:
transmitting, by processing circuitry of a distributing user terminal to a server apparatus, information about a video including a character object that behaves on a basis of movement of a distributing user and information about an operation of the distributing user; and
performing, by the processing circuitry on the video and in accordance with the operation of the distributing user, a display control process by applying a predetermined presentation effect to the character object included in the video, or displaying a presentation screen including a predetermined character image related to the character object, wherein
the performing the display control process is performed in response to a first operation by the distributing user, the first operation being on a first operation object displayed on a screen of the distributing user terminal, and
the performing the display control process is performed in response to not accepting a second operation by the distributing user for a predetermined period of time, the second operation relating to audio information and/or motion information of the distributing user, and the motion information being for moving the character object.

15. The information processing method according to claim 14, wherein the applying the predetermined presentation affect is performed by displaying, in association with the character object in a motionless state, an object for showing a viewing user that the character object is not behaving on a basis of movement of the distributing user.

16. The information processing method according to claim 14, wherein
the character image included in the presentation screen is a two-dimensional version of the character object or a smaller-sized version of the character object, and
the character image does not behave on a basis of movement of the distributing user.

17. The information processing method according to claim 14, further comprising accepting a setting made by the distributing user for the display control process, the setting being any of:
a setting for a background of the presentation screen,
a setting for the predetermined period of time,
a setting for text to be displayed on the presentation screen,
a setting for audio input during the display control process, and
a setting for the character object having the predetermined presentation effect applied thereto or for the character image.

* * * * *